(12) United States Patent
Micali

(10) Patent No.: US 8,732,457 B2
(45) Date of Patent: May 20, 2014

(54) SCALABLE CERTIFICATE VALIDATION AND SIMPLIFIED PKI MANAGEMENT

(75) Inventor: Silvio Micali, Brookline, MA (US)

(73) Assignee: Assa Abloy AB, Stockholm (SE)

( * ) Notice: Subject to any disclaimer, the term of this patent is extended or adjusted under 35 U.S.C. 154(b) by 2171 days.

(21) Appl. No.: 10/103,541

(22) Filed: Mar. 20, 2002

(65) Prior Publication Data

US 2002/0165824 A1    Nov. 7, 2002

Related U.S. Application Data

(63) Continuation-in-part of application No. 09/915,180, filed on Jul. 25, 2001, now Pat. No. 6,766,450, which is a continuation of application No. 09/483,125, filed on Jan. 14, 2000, now Pat. No. 6,292,893, which is a (Continued)

(51) Int. Cl.
   *H04L 29/06*    (2006.01)

(52) U.S. Cl.
   USPC ............... 713/156; 726/2; 726/17; 726/20; 340/426.28; 713/158

(58) Field of Classification Search
   USPC .......... 713/1, 2, 188, 194, 156, 158; 380/200, 380/201, 255, 277; 726/2, 17, 20; 340/426.28
   See application file for complete search history.

(56) References Cited

U.S. PATENT DOCUMENTS

| 4,200,770 A | 4/1980 | Hellman et al. |
| 4,218,582 A | 8/1980 | Hellman et al. |

(Continued)

FOREIGN PATENT DOCUMENTS

| EP | 0 618 550 A1 | 3/1994 |
| EP | 0 723 251 A2 | 1/1996 |

(Continued)

OTHER PUBLICATIONS

\*\*Facsimile message from Chini Krishnan of Integris Security, Inc. to Professor Silvio Micali, dated Feb. 17, 1997, 7 pages including cover sheet, submitted in attached sealed envelope as Proprietary Material Not Open to Public. To Be Opened Only by Examiner or Other Authorized U.S. Patent and Trademark Office Employee.

(Continued)

*Primary Examiner* — Saleh Najjar
*Assistant Examiner* — Joseph Pan
(74) *Attorney, Agent, or Firm* — Muirhead and Saturnelli, LLC

(57) ABSTRACT

Managing a digital certificate includes a landlord providing a digital certificate, a secure hardware device generating a series of n hash values, the secure hardware device providing an nth hash value to the landlord, wherein other hash values are not readily available to the landlord, the landlord placing the nth hash value in the certificate, the landlord digitally verifying the certificate containing the nth hash value to obtain a digitally signed certificate, a tenant obtaining the digitally signed certificate, the tenant obtaining the n hash values and the tenant managing the certificate by periodically issuing a previous hash value in the series of n hash values in response to the certificate being valid when the previous hash value is issued.

42 Claims, 1 Drawing Sheet

Related U.S. Application Data continuation of application No. 09/356,745, filed on Jul. 19, 1999, now abandoned, which is a continuation of application No. 08/823,354, filed on Mar. 24, 1997, now Pat. No. 5,960,083, which is a continuation of application No. 08/559,533, filed on Nov. 16, 1995, now Pat. No. 5,666,416, application No. 10/103,541, which is a continuation-in-part of application No. 08/992,897, filed on Dec. 18, 1997, now Pat. No. 6,487,658, which is a continuation-in-part of application No. 08/715,712, filed on Sep. 19, 1996, now abandoned, and a continuation-in-part of application No. 08/729,619, filed on Oct. 11, 1996, now Pat. No. 6,097,811, and a continuation-in-part of application No. 08/804,868, filed on Feb. 24, 1997, now abandoned, which is a continuation of application No. 08/741,601, filed on Nov. 1, 1996, now abandoned, said application No. 08/992,897 is a continuation-in-part of application No. 08/872,900, filed on Jun. 11, 1997, now abandoned, which is a continuation of application No. 08/746,007, filed on Nov. 5, 1996, now Pat. No. 5,793,868, said application No. 08/992,897 is a continuation-in-part of application No. 08/906,464, filed on Aug. 5, 1997, now abandoned, which is a continuation of application No. 08/763,536, filed on Dec. 9, 1996, now Pat. No. 5,717,758, which is a continuation-in-part of application No. 08/636,854, filed on Apr. 23, 1996, now Pat. No. 5,604,804, said application No. 08/992,897 is a continuation-in-part of application No. 08/756,720, filed on Nov. 26, 1996, now abandoned, which is a continuation-in-part of application No. 08/715,712, filed on Sep. 19, 2006, now abandoned, and a continuation-in-part of application No. 08/559,533, filed on Nov. 16, 1995, now Pat. No. 5,666,416, said application No. 08/992,897 is a continuation-in-part of application No. 08/752,223, filed on Nov. 19, 1996, now Pat. No. 5,717,757, and a continuation-in-part of application No. 08/804,869, filed on Feb. 24, 1997, now abandoned, which is a continuation of application No. 08/741,601, filed on Nov. 1, 1996, now abandoned, said application No. 08/992,897 is a continuation-in-part of application No. 08/823,354, filed on Mar. 24, 1997, now Pat. No. 5,960,083, which is a continuation of application No. 08/559,533, filed on Nov. 16, 1995, now Pat. No. 5,666,416.

(60) Provisional application No. 60/006,038, filed on Oct. 24, 1995, provisional application No. 60/033,415, filed on Dec. 18, 1996, provisional application No. 60/004,796, filed on Oct. 2, 1995, provisional application No. 60/006,143, filed on Nov. 2, 1995, provisional application No. 60/025,128, filed on Aug. 29, 1996, provisional application No. 60/035,119, filed on Feb. 3, 1997, provisional application No. 60/024,786, filed on Sep. 10, 1996, provisional application No. 60/025,128, filed on Aug. 29, 1996, provisional application No. 60/277,244, filed on Mar. 20, 2001, provisional application No. 60/300,621, filed on Jun. 25, 2001, provisional application No. 60/344,245, filed on Dec. 27, 2001.

(56) References Cited

U.S. PATENT DOCUMENTS

| | | |
|---|---|---|
| 4,309,569 A | 1/1982 | Merkle |
| 4,326,098 A | 4/1982 | Bouricius et al. |
| 4,825,052 A | 4/1989 | Chemin et al. |
| 4,879,747 A | 11/1989 | Leighton et al. |
| 4,881,264 A | 11/1989 | Merkle |
| 4,888,801 A | 12/1989 | Foster et al. |
| 4,926,480 A | 5/1990 | Chaum |
| 4,943,707 A | 7/1990 | Boggan |
| 4,944,009 A | 7/1990 | Micali et al. |
| 4,995,081 A | 2/1991 | Leighton et al. |
| 5,003,597 A | 3/1991 | Merkle |
| 5,005,200 A | 4/1991 | Fischer |
| 5,016,274 A | 5/1991 | Micali et al. |
| 5,097,504 A | 3/1992 | Camion et al. |
| 5,136,646 A | 8/1992 | Haber et al. |
| 5,136,647 A | 8/1992 | Haber et al. |
| 5,157,726 A | 10/1992 | Merkle et al. |
| 5,214,702 A | 5/1993 | Fischer |
| 5,231,666 A | 7/1993 | Matyas |
| 5,261,002 A | 11/1993 | Perlman et al. |
| 5,276,737 A | 1/1994 | Micali |
| 5,299,263 A | 3/1994 | Beller et al. |
| 5,307,411 A | 4/1994 | Anvret et al. |
| 5,315,657 A | 5/1994 | Abadi et al. |
| 5,315,658 A | 5/1994 | Micali |
| 5,340,969 A | 8/1994 | Cox |
| 5,351,302 A | 9/1994 | Micali |
| 5,371,794 A | 12/1994 | Diffie et al. |
| 5,396,624 A | 3/1995 | Campbell, Jr. |
| RE34,954 E | 5/1995 | Haber et al. |
| 5,420,927 A | 5/1995 | Micali |
| 5,432,852 A | 7/1995 | Leighton et al. |
| 5,434,919 A | 7/1995 | Chaum |
| 5,450,493 A | 9/1995 | Maher |
| 5,497,422 A | 3/1996 | Tysen et al. |
| 5,499,296 A | 3/1996 | Micali |
| 5,519,778 A | 5/1996 | Leighton et al. |
| 5,537,475 A | 7/1996 | Micali |
| 5,544,322 A | 8/1996 | Cheng et al. |
| 5,551,027 A | 8/1996 | Choy et al. |
| 5,553,145 A | 9/1996 | Micali |
| 5,604,804 A | 2/1997 | Micali |
| 5,606,617 A | 2/1997 | Brands et al. |
| 5,610,982 A | 3/1997 | Micali |
| 5,615,268 A | 3/1997 | Bisbee et al. |
| 5,615,269 A | 3/1997 | Micali |
| 5,629,982 A | 5/1997 | Micali |
| 5,638,447 A | 6/1997 | Micali |
| 5,659,616 A | 8/1997 | Sudia |
| 5,659,617 A | 8/1997 | Fischer |
| 5,666,414 A | 9/1997 | Micali |
| 5,666,415 A | 9/1997 | Kaufman |
| 5,666,416 A | 9/1997 | Micali |
| 5,666,420 A | 9/1997 | Micali |
| 5,677,955 A | 10/1997 | Doggett et al. |
| 5,687,235 A | 11/1997 | Perlman et al. |
| 5,699,431 A | 12/1997 | Van Oorschot et al. |
| 5,717,757 A | 2/1998 | Micali |
| 5,717,758 A | 2/1998 | Micall |
| 5,717,759 A | 2/1998 | Micali |
| 5,742,035 A | 4/1998 | Kohut |
| RE35,808 E | 5/1998 | Micali |
| 5,748,738 A | 5/1998 | Bisbee et al. |
| 5,768,379 A * | 6/1998 | Girault et al. ............... 713/185 |
| 5,774,552 A | 6/1998 | Grimmer |
| 5,790,665 A | 8/1998 | Micali |
| 5,790,790 A | 8/1998 | Smith et al. |
| 5,793,868 A | 8/1998 | Micali |
| 5,799,086 A | 8/1998 | Sudia |
| 5,812,670 A | 9/1998 | Micali |
| 5,825,880 A | 10/1998 | Sudia et al. |

(56) References Cited

U.S. PATENT DOCUMENTS

| | | | |
|---|---|---|---|
| 5,826,262 | A | 10/1998 | Bui et al. |
| 5,838,790 | A * | 11/1998 | McAuliffe et al. ........... 713/176 |
| 5,841,865 | A | 11/1998 | Sudia |
| 5,850,451 | A | 12/1998 | Sudia |
| 5,857,022 | A | 1/1999 | Sudia |
| 5,867,578 | A | 2/1999 | Brickell et al. |
| 5,875,894 | A | 3/1999 | Stromme |
| 5,903,651 | A | 5/1999 | Kocher |
| 5,903,882 | A | 5/1999 | Asay et al. |
| 5,960,083 | A | 9/1999 | Micali |
| 5,978,475 | A * | 11/1999 | Schneier et al. ............. 713/177 |
| 5,982,898 | A | 11/1999 | Hsu et al. |
| 5,995,625 | A | 11/1999 | Sudia et al. |
| 6,009,177 | A | 12/1999 | Sudia |
| 6,026,163 | A | 2/2000 | Micali |
| 6,044,462 | A | 3/2000 | Zubeldia et al. |
| 6,061,448 | A | 5/2000 | Smith et al. |
| 6,097,811 | A | 8/2000 | Micali |
| 6,119,137 | A | 9/2000 | Smith et al. |
| RE36,918 | E | 10/2000 | Micali |
| 6,134,326 | A | 10/2000 | Micali et al. |
| 6,137,884 | A | 10/2000 | Micali |
| 6,141,750 | A | 10/2000 | Micali |
| 6,151,675 | A | 11/2000 | Smith |
| 6,189,103 | B1 * | 2/2001 | Nevarez et al. .................... 726/5 |
| 6,192,407 | B1 | 2/2001 | Smith et al. |
| 6,209,091 | B1 | 3/2001 | Sudia et al. |
| 6,216,231 | B1 | 4/2001 | Stubblebine |
| 6,292,893 | B1 | 9/2001 | Micali |
| 6,301,659 | B1 | 10/2001 | Micali |
| 6,385,655 | B1 | 5/2002 | Smith et al. |
| 6,389,536 | B1 * | 5/2002 | Nakatsuyama ............... 713/165 |
| 6,397,329 | B1 * | 5/2002 | Aiello et al. .................. 713/155 |
| 6,404,337 | B1 * | 6/2002 | Van Till et al. ............... 340/569 |
| 6,442,689 | B1 | 8/2002 | Kocher |
| 6,470,086 | B1 | 10/2002 | Smith |
| 6,487,599 | B1 | 11/2002 | Smith et al. |
| 6,487,658 | B1 | 11/2002 | Micali |
| 6,502,191 | B1 | 12/2002 | Smith et al. |
| 6,516,411 | B2 | 2/2003 | Smith |
| 6,529,956 | B1 | 3/2003 | Smith et al. |
| 6,532,540 | B1 | 3/2003 | Kocher |
| 6,609,196 | B1 | 8/2003 | Dickinson, III et al. |
| 6,651,166 | B1 | 11/2003 | Smith et al. |
| 6,658,568 | B1 | 12/2003 | Ginter et al. |
| 6,671,805 | B1 | 12/2003 | Brown et al. |
| 6,725,381 | B1 | 4/2004 | Smith et al. |
| 6,748,529 | B2 | 6/2004 | Smith et al. |
| 6,766,450 | B2 | 7/2004 | Micali |
| 6,826,609 | B1 | 11/2004 | Smith et al. |
| 6,910,628 | B1 * | 6/2005 | Sehr ............................. 235/384 |
| 6,981,142 | B1 | 12/2005 | Gulcu |
| 7,111,165 | B2 * | 9/2006 | Liden et al. ................... 713/170 |
| 2001/0011255 | A1 | 8/2001 | Asay et al. |
| 2001/0050990 | A1 | 12/2001 | Sudia |
| 2001/0056409 | A1 * | 12/2001 | Bellovin et al. ................. 705/64 |
| 2002/0013898 | A1 | 1/2002 | Sudia et al. |
| 2002/0029200 | A1 | 3/2002 | Dulin et al. |
| 2002/0029337 | A1 | 3/2002 | Sudia et al. |
| 2002/0062438 | A1 | 5/2002 | Asay et al. |
| 2002/0107814 | A1 | 8/2002 | Micali |
| 2002/0165824 | A1 | 11/2002 | Micali |
| 2002/0184182 | A1 | 12/2002 | Kwan |
| 2003/0014365 | A1 | 1/2003 | Inada et al. |
| 2003/0065921 | A1 | 4/2003 | Chang |
| 2003/0212888 | A1 | 11/2003 | Wildish et al. |
| 2003/0221101 | A1 | 11/2003 | Micali |
| 2004/0049675 | A1 | 3/2004 | Micali et al. |
| 2004/0111607 | A1 | 6/2004 | Yellepeddy |
| 2004/0237031 | A1 | 11/2004 | Micali et al. |
| 2005/0010783 | A1 | 1/2005 | Libin et al. |
| 2005/0033962 | A1 | 2/2005 | Libin et al. |
| 2005/0044376 | A1 | 2/2005 | Libin et al. |
| 2005/0044386 | A1 | 2/2005 | Libin et al. |
| 2005/0044402 | A1 | 2/2005 | Libin et al. |
| 2005/0055548 | A1 | 3/2005 | Micali |
| 2005/0055567 | A1 | 3/2005 | Libin et al. |
| 2005/0114653 | A1 | 5/2005 | Sudia |
| 2005/0114666 | A1 | 5/2005 | Sudia |
| 2005/0154878 | A1 | 7/2005 | Engberg et al. |
| 2005/0154879 | A1 | 7/2005 | Engberg et al. |
| 2005/0154918 | A1 | 7/2005 | Engberg |
| 2005/0193204 | A1 | 9/2005 | Engberg et al. |
| 2006/0097843 | A1 | 5/2006 | Libin |

FOREIGN PATENT DOCUMENTS

| | | |
|---|---|---|
| EP | 0 798 671 A2 | 2/1997 |
| EP | 1 024 239 A1 | 1/1999 |
| FR | 2 774 833 A1 | 2/1998 |
| WO | WO98/26385 | 6/1998 |
| WO | WO 98/26385 | 6/1998 |
| WO | WO 98/43152 | 10/1998 |
| WO | WO 00/22787 | 4/2000 |
| WO | WO 01/06701 A1 | 1/2001 |
| WO | WO 01/11812 A2 | 2/2001 |
| WO | WO 01/11843 | 2/2001 |
| WO | WO 01/25874 A2 | 4/2001 |

OTHER PUBLICATIONS

**Facsimile message from Chini Krishnan of Integris Security, Inc. To Professor Silvio Micali, dated Feb. 25, 1997, 13 pages including cover sheet, submitted in attached sealed envelope as Proprietary Material Not Open to Public. To Be Opened Only by Examiner or Other Authorized U.S. Patent and Trademark Office Employee.

"Distributed Certificate Validation: The answer to validation scalability, availability and cost issues," *CoreStreet White Paper*, published at www.corestreet.com, Jun. 12, 2003, 14 pp.

"Distributed OCSP: Security, Scalability, and Availability for Certificate Validation," *CoreStreet White Paper*, published at www.corestreet.com, 2002, 4 pp.

"Real Time Credential Validation: Secure, Efficient Permissions Management," *CoreStreet White Paper*, published at www.corestreet.com, 2002, 5 pages.

"Real Time Credential Validation: Secure, Efficient Permissions Management," *CoreStreet White Paper*, published at www.corestreet.com, 2002-2004, 5 pp.

"Identity Services Infrastructure™: A practical approach to ensuring trust and privacy in government and industry," *CoreStreet White Paper*, published at www.corestreet.com, 2006, 13 pp.

"The Roles of Authentication, Authorization & Cryptography in Expanding Security Industry Technology," Security Industry Association, *Quarterly Technical Update*, Dec. 2005, 32 pp.

"Important FIPS 201 Deployment Considerations: Ensuring Your Implementation is Future-Ready," *White paper*, published at www.corestreet.com, 2005-2006, 11 pp.

"Vulnerability Analysis of Certificate Validation Systems," *CoreStreet White Paper*, published at www.corestreet.com, 2006, 15 pp.

"The Role of Practical Validation for Homeland Security," *CoreStreet White Paper*, published at www.corestreet.com, 2002-2004, 3 pp.

"Distributed Certificate Validation," *CoreStreet White Paper*, published at www.corestreet.com, 2006, 16 pp.

"Certificate Validation Choices: Evaluation criteria for selecting the appropriate validation mechanism for your needs," *CoreStreet white paper*, published at www.corestreet.com, 2002-2004, 8 pp.

"Nonce Sense: Freshness and Security in OCSP Responses," *CoreStreet White Paper*, published at www.corestreet.com, 2003-2004, 2 pp.

"Sistema Distruito Per II Controllo Della Validita Dei Certificati Digitali: Prestazioni—Disponibilita'—Costi," *CoreStreet white paper*, published at www.corestreet.com, visited Aug. 7, 2006, 17 pp.

"Analisi Della Vunlerabilita' Dei Sistemi Di Convalida Dei Certificati Digitali," *CoreStreet white paper*, published at www.corestreet.com, visited Aug. 7, 2006, 17 pp.

Jon Shamah, "From eID to Identity Services Infrastructure—Practical implementations for sustainable success," Presentation , published at www.corestreet.com, *e-ID Conference* (Brussels, Belgium), Feb. 22, 2006, 48 pp.

(56) References Cited

OTHER PUBLICATIONS

"U.S. Department of Homeland Security First Responders Card Initiative," Transcript, *All Hazards Forum Conference and Exhibition*, Moderator Craig A. Wilson, Baltimore, Maryland, Oct. 26, 2005, 42 pp.

"Card-Connected System," *Functional Specification*, published at www.corestreet.com, 2005, 6 pp.

"Card-Connected System," *Architects and Engineers Specification*, published at www.corestreet.com, 2005, 11 pp.

"CoreStreet Validation Authority," *CoreStreet Data Sheet*, published at www.corestreet.com, 2006, 2 pp.

"Responder Applicance 2400," *CoreStreet Data Sheet*, published at www.corestreet.com, 2006, 1 p.

"Desktop Validation Client," *CoreStreet Data Sheet*, published at www.corestreet.com, 2006, 1 p.

"Server Validation Extension," *CoreStreet Data Sheet*, published at www.corestreet.com, 2006, 1 p.

"Path Builder System™: for Federated PKI," *CoreStreet Data Sheet*, published at www.corestreet.com, 2006, 1 p.

"PKI Toolkit: Developer toolkit to enable certificate validation," *CoreStreet Data Sheet*, published at www.corestreet.com, 2006, 1 p.

"MiniCRL," *CoreStreet data sheet*, published at www.corestreet.com, 2006, 1 p.

"PIVMAN™ System: Secure ID Checking," *CoreStreet data sheet*, published at www.corestreet.com, 2006, 1 p.

"The PIVMAN™ System: Implementing secure ID checking for site control in emergencies," *CoreStreet Product Implementation Overview*, published at www.corestreet.com, 2006, 4 pp.

"The PIVMAN™ System: Deployment and use case overview," *CoreStreet Product Application Overview*, published at www.corestreet.com, 2006, 4 pp.

"Card-Connected™ Access Control," *Corestreet data sheet*, published at www.corestreet.com, 2006, 1 p.

"FIPS 201 Solutions," *Corestreet Solutions Overview*, published at www.corestreet.com, 2005, 1 p.

"Common Criteria Factsheet: Understanding the importance of certification," *Corestreet Fact Sheet*, published at www.corestreet.com, 2006, 1 p.

"Security Requirements for Cryptographic Modules," *Federal Information Processing Standards (FIPS) Publication 140-2*, Information Technology Laboratory, National Institute of Standards and Technology, Gaithersburg, MD 20899, May 25, 2001.

"Final Text of Draft Amendments DAM 4 to ISO/IEC 9594-2, DAM 2 to ISO/IEC 9594-6, DAM I to ISO/IEC 9594-7, and DAM 1 to ISO/IEC 9594-8 on Certificate Extensions," *ISO/IEC JTC I/SC 21/WG 4 and ITU-T Q 15/7 Collaborative Editing Meeting on the Directory*, Dec. 1996, 54 pp.

Christoffersson et al., *Crypto User's Handbook, A Guide for Implementors of Cryptographic Protection in Computer Systems*, Elsevier Science Publishers B. V., 1988, pp. 8-85.

M. Ito, et al., "Secret Sharing Scheme Realizing General Access Structure," Dept. of Electrical Communications, Tohoku University, Sendai, Miyagi 9890, Japan, 1987, pp. 3.6.1-3.6.4.

L. Gong, "Securely replicating authentication services," *Proceedings of the International Conference on Distributed Computing Systems*, IEEE Computer Society Press, 1989. pp. 85-91.

International Search Report from PCT/US 96/17374, dated Feb. 19, 1997, 3 pp.

C.J. Mitchell and F.C. Piper, "Key Storage in Secure Networks," *Discrete Applied Mathematics*, vol. 21, No. 3, 1988, pp. 215-228.

D. Otway and O. Rees, "Efficient and timely mutual authentication," *SIGOPS Oper. Syst. Rev.* vol. 21, No. 1, Jan. 1987, pp. 8-10.

"The Digital Signature Standard," National Institute of Standards and Technology (NIST), Proposal and Discussion, *Comm. of the ACM*, 35 (7), Jul. 1992, pp. 36-54.

F. T. Leighton, "Failsafe Key Escrow Systems," *Technical Memo 483, MIT Lab. for Computer Science*, 1994, 9 pp.

B. Fox and B. LaMacchia, "Certificate Revocation: Mechanics and Meaning," *Proceedings of Financial Cryptography '98*, Lecture Notes in Computer Science 1465, Springer-Verlag, Jan. 1998, pp. 158-164.

R. Blom, "An optional class of symmetric key generation schemes," Proceedings of Advances in Cryptology-EUROCRYPT'84, Lecture Notes in Computer Science 209, Spring-Verlag, 1985, pp. 335-338.

C. Blundo, et al., "Perfectly Secure Key Distribution for Dynamic Conferences" *Proceedings of Advances in Cryptology: CRYPTO '92*, Springer-Verlag, Berlin, 1993, pp. 471-486.

D. Beaver, "Multiparty Protocols Tolerating Half Faulty Processors," *Proceedings of Advances in Cryptology '89*, Lecture Notes in Computer Science 435, G. Brassard, Ed. Springer-Verlag, London, 1990, pp. 560-572.

B. Schneier, *Applied Cryptography* $2^{nd}$ ed.; John Wiley & Sons, Inc., 1996, pp. 42-65, 574-576, 591, 593.

"Escrowed Encryption Standard (EES)," *Federal Information Processing Standards (FIPS) Publication 185*, Computer Systems Laboratory, National Institute of Standards and Technology, Gaithersburg, MD 20899, Feb. 1994.

S. Chokhani, "Toward a National Public Key Infrastructure," *IEEE Communications Magazine*, vol. 32, No. 9, Sep. 1994, pp. 70-74.

M. Gasser, et al., "The Digital Distributed System Security Architecture," *Proc. 1 $2^{th}$ National Computer Security Conference*, 1989, pp. 305-319.

R. L. Rivest, et al., "SDSI—A Simple Distributed Security Infrastructure," 1996, pp. 1-39.

D. L. Chaum, "Untraceable Electronic Mail, Return Addresses, and Digital Pseudonyms," Technical Note Programming Techniques and Data Structures, *Communications of the ACM*, vol. 24, No. 2, Feb. 1981, pp. 84-88.

R. Gennaro, et al., "Robust Threshold DSS Signatures," *Proc. of Advances in Cryptology: EUROCRYPT '96*, Lecture Notes in Computer Science 1070, 1996, 20 pp.

"Federal Public Key Infrastructure (PKI) Technical Specifications: Part D—Interoperability Profiles," (DRAFT) *Federal PKI Technical Working Group, Inc.*, Cygnacom Solutions, 1995, 91 pp.

N. Nazario, "Federal Public Key Infrastructure (PKI) Version 1 Technical Specifications: Part B—Technical Security Policy," *PKI Technical Working Group*, 1996, 21 pp.

S. Chokhani and W. Ford, "Certificate Policy and Certification Practice Statement Framework," (DRAFT) *CygnaCom Solutions, Inc.*, Nov. 1996, 80 pp.

William E. Burr, et al., "A Proposed Federal PKI Using X.509 V3 Certificates," *National Institute of Standards and Technology (NIST)*, Gaithersburg, MD 20899, 1996, 8 pp.

W.E. Burr, "Public Key Infrastructure (PKI) Technical Specifications (Version 1): Part C—Concept of Operations," (DRAFT) Feb. 1996, 30 pp.

Warwick Ford, "Public-Key Infrastructure Standards," *PP Presentation*, 1996, 15 pp.

William T. Polk, "Minimum Interoperability Specifications for PKI Components," *NIST presentation*, 1996, 13 pp.

Santosh Chokhani, Ph.D., "Security Considerations in Using X.509 Certificates," *PP Presentation*, 1996, 11 pp.

Donna F. Dodson, "PKI Implementation Projects," *NIST Presentation*, 1996, 17 pp.

William E. Burr, et al., "A Proposed Federal PKI Using X.509 V3 Certificates," *NIST Presentation*, 1996, 12 pp.

Noel A. Nazario, et al., "Management Model for the Federal Public Key Infrastructure," *NIST Presentation*, 1996, 9 pp.

Noel A. Nazario, "Security Policies for the Federal Public Key Infrastructure," *NIST Presentation*, 1996, 11 pp.

William Burr, et al., "Minimum Interoperability Specification for PKI Components," *Output of NIST's Cooperative Research and Development Agreements for Public Key Infrastructure development with AT&T, BBN, Certicom, Cylink, DynCorp, IRE, Motorola, Northern Telecom, Spyrus, and VeriSign*, Draft Version 1, 1996.

Farrell, et al., "Internet Public Key Infrastructure Part III: Certificate Management Protocols," *Internet Draft, PKIX Working Group*, Dec. 1996.

W. Polk, ed., "Requirements for the Federal Public Key Infrastructure (Version 1) Part A: Requirements," 1996, 19 pp.

(56) References Cited

OTHER PUBLICATIONS

Warwick Ford, "A Public Key Infrastructure for U.S. Government Unclassified but Sensitive Applications," *NORTEL/Bell-Northern Research, National Institute of Standards and Technology*, 1995, 94 pp.

B. Garner, ed., "A Dictionary of Modern Legal Usage," Oxford Univ. Press, 1987, p. 930.

L. Harn, "Group-Oriented (t, n) threshold digital signature scheme and digital multisignature," *IEE Proc-Comput. Digit. Tech.*, vol. 141, No. 5, Sep. 1994, pp. 307-313.

Oded Goldreich, "Two Remarks Concerning the Goldwasser-Micali-Rivest Signature Scheme," *Laboratory for Computer Science, Massachusetts Institute of Technology MIT/LCS/TM-315*, Sep. 1986, 10 pp.

S. Goldwasser, et al., "The Knowledge Complexity of Interactive Proof Systems," *Society for Industrial and Applied Mathematics (SIAM) J. Comput.*, vol. 18, No. 1, Feb. 1989, pp. 186-208.

"X9-Financial Services: American National Standard X9.55/1995," *American National Standards Institute, Accredited Standards Committee X9(Working Draft)*, Jul. 3, 1996, 41 pp.

S. Micali, et al., "An Efficient Zero-Knowledge Method for Answering is He in or Out? Questions," *Abstract of talk given at International Computer Science Institute*, Berkeley, CA, Dec. 1995.

"Information technology—Open Systems Interconnection—The Directory: Authentication framework," *International Standard ISO/IEC 9594-8*, 1995, 41 pp.

Z. Galil, et al., "Partitioned Encryption and Achieving Simultaneity by Partitioning," *Information Processing* Letters 26 (1987/88), Oct. 1987, pp. 81-88.

Paul Neil Feldman, "Optimal Algorithms for Byzantine Agreement," *Thesis submitted for Doctor of Philosophy in Mathematics at the Massachusetts Institute of Technology*, May 1988.

B. Chor, et al., "Verifiable Secret Sharing and Achieving Simultaneity in the Presence of Faults," *IEEE*, 1985, pp. 383-395.

D. Chaum, "Security Without Identification: Transaction Systems to Make Big Brother Obsolete," Communications of the ACM, vol. 28, No. 10, Oct. 1985, pp. 1030-1044.

V. Varadharajan, "Notification: A Pratical Security Problem in Distributed Systems," *Proc. of the 14th National Computer Security Conference*, National Institute of Standards and Technology / National Computer Security Center, Oct. 1-4, 1991, pp. 386-396.

Silvio Micali, "Computationally-Sound Proofs," *Laboratory for Computer Science, Massachusetts Institute of Technology*, Apr. 11, 1995, 56 pp.

Silvio Micali, *Proc. of Advances in Cryptology—CRYPTO '92*, Lecture Notes in Computer Science 740, Aug. 1992, pp. 113-138.

J. L. Abad-Peiro, et al., "Designing a Generic Payment Service," *IBM Research Division, Zurich Research Laboratory*, Nov. 1996, 26 pp.

R. Ankney, "A Certificate-Based Authorization Model," *Fisher International*, Sep. 25, 1995, 20 pp.

D. Chaum, et al., "Multiparty Unconditionally Secure Protocols," ACM-0-89791-264, 1988, pp. 11-19.

O. Goldreich, et al., "Proofs that Yield Nothing But Their Validity or All Languages in NP Have Zero-Knowledge Proof Systems," *Journal of the Association for Computing Machinery*, vol. 38, No. 1, Jul. 1999, pp. 691-729.

M. K. Franklin, et al., "Fair Exchange with a Semi-Trusted Third Party," *Proc. of the 4th ACM Conference on Computer and Communications Security*, Apr. 1997, 6 pp.

A. Fiat, et al., "How to Prove Yourself: Practical Solutions to Identification and Signature Problems," *Proc. of Advances in Cryptology: Proc. Crypto '86*, Lecture Notes in Computer Science 263, 1987, pp. 186-194.

D. Dolev, et al., "Non-Malleable Cryptography," ACM 089791-397-3, 1991, pp. 542-552.

Richard A. DeMillo, et al., "Cryptology in Revolution: Mathematics and Models," *Lecture Notes Prepared for the American Mathematical Society Short Course Held in San Francisco, CA*, Jan. 5-6, 1981, ISBN 0/8218-0041-8, 1983, pp. 152-155.

Ivan Bjerre Damgård, "Payment Systems and Credential Mechanisms with Provable Security Against Abuse by Individuals," *Proc. of Advances in Cryptology—CRYPTO '88*, 1988, pp. 328-335.

O. Goldreich, et al., "How to Play Any Mental Game or a Completeness Theorem for Protocols with Honest Majority," ACM 0-89791-221-7, 1987, pp. 218-229.

Y. Frankel, et al., "Indirect Discourse Proofs: Achieving Efficient Fair Off-Line E-Cash," *Proc. of Advances in Cryptology, ASIACRYPT '96*, Lecture Notes in Computer Science 1163, Springer Verlag, 1996, pp. 286-300.

S. Micali, "A Secure and Efficient Digital Signature Algorithm," *Technical Memo, Laboratory for Computer Science, Massachusetts Institute of Technology*, Cambridge, MA 02139, Mar. 1994, 12 pp.

"Initial EFF Analysis of Clinton Privacy. And Security Proposal," *Society for Electronic Access, The Electronic Frontier Foundation*, Apr. 1993, 3 pp.

L. Lamport, "Password Authentication with Insecure Communication," *Communications of the ACM*, Technical Note Operating Systems, vol. 24, No. 11, Nov. 1981, pp. 770-772.

J. Linn, "Privacy Enhancement for Internet Electronic Mail: Part I—Message Encipherment and Authentication Procedures," *Network Working Group Request for Comments: 1040*, Jan. 1988, 28 pp.

S. Kent, "Privacy Enhancement for Internet Electronic Mail: Part II—Certificate-Based Key Managements," *Network Working Group Request for Comments: 1422*, Feb. 1993, 30 pp.

T. Elgamal, "A Public Key Cryptosystem and a Signature Scheme Based on Discrete Logarithms," *IEEE Transactions on Information Theory*, vol. IT-31, No. 4, Jul. 1985, pp. 469-472.

Hauser, et al., "Lowering Security Overhead in Link State Routing," *Computer Networks*, vol. 31, Elsevier, Apr. 1999, pp. 885-894.

S. Herda, "Non-repudiation: Constituting evidence and proof in digital cooperation," *Computer Standards & Interfaces*, vol. 17, Elsevier, 1995, pp. 69-79.

S.G. Stubblebine, "Recent-Secure Authentication: Enforcing Evocation in Distributed Systems, Security and Privacy," *Proc. of the 1995 IEEE Symposium on Security and Privacy*, Section 5, 1995, pp. 224-235.

Ronald L. Rivest and Adi Shamir, "PayWord and MicroMint: Two simple micropayment schemes," *MIT Laboratory for Computer Science 545 Technology Square, Cambridge, Mass 02139; Wezmann Institute of Science Applied Mathematics Department*, Rehovot, Israel, Apr. 27, 2001, 19 pp.

R. L. Rivest et al., "A Method for Obtaining Digital Signatures and Public-Key Cryptosystems," *Communications of the ACM*, Programming Techniques, vol. 21, No. 2, Feb. 1978, pp. 120-126.

M. Bellare, et al., "Incremental cryptography: the case of hashing and signing," *Proc. of Advances in Cryptology—CRYPTO '94*, Lecture Notes in Computer Science 839, Springer-Verlag, 1994, pp. 216-233.

M. Bellare and S. Micali, "How to Sign Given Any Trapdoor Permutation," *J. of the Assoc. for Computing Machinery*, vol. 39, No. 1, Jan. 1992, pp. 214-233.

J. C. Benaloh, "Secret Sharing Homomorphisms: Keeping Shares of a Secret Secret (Extended Abstract)," *Proc. of Advances in Cryptology—CRYPTO '86*, Lecture Notes in Computer Science 263, Springer-Verlag, 1986, pp. 216-233.

W. Johnston, et al., "Authorization and Attribute Certificates for Widely Distributed Access Control," *IEEE 7th International Workshops on Enabling Technologies: Infrastructure for Collaborative Enterprises*, 1998, 6 pp.

P. Janson and M. Waidner, "Electronic Payment over Open Networks," *IBM Zurich Research Laboratory*, Apr. 18, 1995, 9 pp.

E. D. Karnin, et al., "On Secret Sharing Systems," *IEEE Transactions on Information Theory*, vol. IT-29, No. 1, Jan. 1983, pp. 35-41.

S. Micali, and R. L. Rivest, R. L., "Micropayments Revisited," *Proc. of the the Cryptographer's Track At the RSA Conference on Topics in Cryptology* (Feb. 18-22, 2002), Lecture Notes in Computer Science 2271. Springer-Verlag, London, 2002, 149-163.

Silvio Micali, "Enhanced Certificate Revocation," *Technical Memo MIT/LCS/TM-542 b, Laboratory for Computer Science, Massachusetts Institute of Technology*, Mar. 22, 1996, 10 pp.

R. Housley, et al., "Internet Public Key Infrastructure Part I: x.509 Certificate and CRL Profile," *Internet Engineering Task Force, PKIX Working Group, Internet Draft*, Mar. 26, 1996, 76 pp.

(56) References Cited

OTHER PUBLICATIONS

T. Elgamal, et al., "Securing Communications on the Intranet and Over the Internet," White Paper, *Netscape Communications Corporation*, Jul. 1996, 19 pp.
S. Berkovits, et al., "Public Key Infrastructure Study," Final Report, *National Institute of Standards and Technology*, Gaithersburg MD, Apr. 1994, 193 pp.
M. Ben-Or, et al., "Completeness Theorems for Non-Cryptographic Fault-Tolerant Distributed Computation," ACM-0-89791-264, 1988, 10 pp.
M. Ben-Or, et al., "A Fair Protocol for Signing Contracts," *IEEE Transactions on Information Theory*, vol. 36, No. 1, Jan. 1990, pp. 40-46.
G. R. Blakley, "Safeguarding cryptographic keys," *AFIPS—Proc. of the National Computer Conference*, vol. 48, 1979, pp. 313-317.
J. Camenisch, et al., "An Efficient Fair Payment System," ACM-089791-892-0, 1996, 7 pp.
J. Camenisch, et al., "Digital Payment Systems with Passive Anonymity-Revoking Trustees," *Computer Security—ESORICS '96*, Lecure Notes in Computer Science 1146, Springer Verlag, 1996, pp. 33-43.
M. Blum, "How to Exchange (Secret) Keys," *ACM Transactions on Computer Systems*, vol. 1, No. 2, May 1983, pp. 175-193.
H. Bürk, et al., "Digital Payment Systems Enabling Security and Unobservability," *Computers & Security*, vol. 8, Elsevier Science, 1989, pp. 399-416.
G. Brassard, et al., "Minimum Disclosure Proofs of Knowledge," *J. of Computer and System Sciences*, vol. 37, 1988, pp. 156-189.
D. Chaum, et al., "Untraceable Electronic Cash," *Proc. of the 8th Annual international Cryptology Conference on Proc. of Advances in Cryptology* (Aug. 21-25, 1988), Lecture Notes in Computer Science 403, Springer-Verlag, 1990, pp. 319-327.
P. Cheng, et al., "Design and Implementation of Modular Key Management Protocol and IP Secure Tunnel on AIX," *IBM Thomas J. Watson Research Center*, Yorktown Heights, NY, 10598, Apr. 28, 1995, 14 pp.
R. DeMillo, et al., "Protocols for Data Security," *Computer, IEEE*, Feb. 1983, pp. 39-50.
E-mail from Martin Hellman, "Re: Clipper-Chip Escrow-System Flaws," Apr. 16, 1993, 1 p.
E-mail from Martin Hellman, "Clipper Chip," Apr. 17, 1993, 2 pp.
E-mail from Dorothy Denning, "Re: Clipper Chip," Apr. 18, 1993, 3 pp.
Y. Desmedt, et al., "Threshold cryptosystems," *Proc. of Advances in Cryptology—CRYPTO 89*, Lecture Notes in Computer Science 435, Springer-Verlag, 1990, pp. 307-315.
W. Diffie, et al., "New Directions in Cryptography," *IEEE Transactions on Information Theory*, vol. IT-22, Nov. 1976, pp. 644-654.
S. Dukach, "SNPP: A Simple Network Payment Protocol," *Proc. of the Eighth Annual Computer Security Applications Conference*, Dec. 1992, 6 pp.
S. Even, et al., "A Randomized Protocol for Signing Contracts," *Communications of the ACM, Programming Techniques and Data Structures*, vol. 28, No. 6, Jun. 1985, pp. 637-647.
S. Even, et al., "On-line/Off-line Digital Signatures," *Proc. of Advances in Cryptology*, Springer-Verlag New York, pp. 263-275.
S. Even, et al., "Secure Off-line Electronic Fund Transfer Between Nontrusting Parties," *Computer Science Department, Technion, Israel Institute of Technology*, Haifa, Israel 32000, Jan. 31, 1988, 10 pp.
O. Goldreich, et al., "Proofs that Yield Nothing But their Validity and a Methodology of Cryptographic Protocol Design," *Proc. of 27th Symp. on Foundation of Computer Science*, 1986, pp. 174-187.
P. Feldman, "A Practical Scheme for Non-interactive Verifiable Secret Sharing," *IEEE Symposium on Foundations of Computer Science*, 1987, pp. 427-437.
A. Fiat, "Batch RSA," *Proc. of Advances in Cryptology—CRYPTO '89*, Lecture Notes on Computer Science 435, Springer-Verlag, 1989, pp. 175-185.

S. Goldwasser, et al., "A Digital Signature Scheme Secure Against Adaptive Chosen-Message Attacks," *Society for Industrial and Applied Mathematics (SIAM) J. Comput.*, vol. 17, No. 2, Apr. 1988, pp. 281-308.
L. C. Guillou, et al., "A 'Paradoxical' Identity-Based Signature Scheme Resulting from Zero-Knowledge," *Proc. of Advances in Cryptology—CRYPTO '88*, Lecture Notes in Computer Sciences 403, Springer Verlag, New York, 1990, pp. 216-231.
K. E. B. Hickman, "The SSL Protocol," Internet Draft, *Netscape Communications Corporation*, Jun. 1995, 32 pp.
M. Jakobsson, "Reducing costs in identification protocols," *Department of Computer Science and Engineering, University of California*, San Diego, La Jolla, CA 92093, 1992, 7 pp.
G. B. Koleta, "Cryptographers Gather to Discuss Research: Analyses of how to break codes and new ways to use codes were featured at the meeting," *Science*, vol. 214, Nov. 6, 1981, pp. 646-647.
P. Janson, et al., "Electronic Payment Systems," *ACTS Project ACO26, SEMPER*, May 1, 1996, pp. 24 pp.
J. Kilian, et al., "Identify Escrow," *Proc. of Advances in Cryptology—CRYPTO '98*, 1998, 18 pp.
A. G. Konheim, "Chapter IX: Digital Signatures and Authentications," *Cryptography, A Primer*, John Wiley & Sons, 1981, pp. 331-347, 365-370.
H. Königs, "Cryptographic Identification Methods for Smart Cards in the Process of Standardization," *IEEE Communications Magazine*, Jun. 1991, pp. 42-47.
S. Low, et al., "Anonymous Credit Cards," *Proc. of the 2nd ACM Conference on Computer and Communications*, Fairfax, Virginia, 1994, 10 pp.
M. Luby, et al., "How to Simultaneously Exchange a Secret Bit by Flipping a Symmetrically-Biased Coin," *Proc. of the 24th IEEE Symposium on Foundations of Computer Science*, Tucson, Arizona, 1983, pp. 11-21.
J. Markoff, "New Communication System Stirs Talk of Privacy vs. Eavesdropping," *The New York Times*, Apr. 16, 1993, 2 pp.
J. Markoff, "Communications Plan Draws Mixed Reaction," *The New York Times*, Apr. 17, 1983, 1 pp.
T. Leighton and S. Micali, "New Approaches to Secret-Key Exchange," *Proc. of Advances in Cryptology—CRYPTO '93*, 1993, 10 pp.
A. J. Menezes, Handbook of Applied Cryptography, CRC Press, 1997, pp. 566, 576-577, 588-589, 706, 716, 720, 728-729, 737.
P. D. Merillat, "Secure stand Alone Positive Personnel Identify Verification System (SSA-PPIV)," Sandia Laboraties, SAND79-0070, Mar. 1979, 21 pp.
R. C. Merkle, "A Certified Digital Signature," *Communications of the ACM*, 1979, pp. 218-238.
R. C. Merkle, "A Digital Signature Based on a Conventional Encryption Function," *Presented at CRYPTO '87*, 1987, 8 pp.
C. H. Meyer and S. M. Matyas, "Chapter 8: Authentication Techniques Using Cryptography," *Cryptography: A New Dimension in Computer Data Security*, John Wiley & Sons, 1982, pp. 350-428.
S. Micali and A. Shamir, "An Improvement of the Fiat-Shamir Identification and Signature Scheme," *Presented at CRYPTO '88*, 1988, 5 pp.
S. Micali, "Guaranteed partial key escrow," *Technical Memo, MIT/LCS TM-537*, Sep. 1995, 13 pp.
S. Micali and A. Shamir, "Partial Key-Escrow," *MIT Laboratory for Computer Science, Cambridge, MA 02139 and Weizmann Institute Computer Science Department*, Rehovot, Israel, Feb. 1996, 13 pp.
S. Micali, "Fair Cryptosystems," *Technical Memo, MIT/LCS TM-579.b*, Nov. 1993, 36 pp.
Website pages @ http://www.valicert.com, Sep. 23, 2002, 8 pp.
T. P. Pedersen, "Electronic payments of small amounts," *Technical report, Aarhus University, Computer Science Department*, Aug. 1995, 12 pp.
T. P. Pedersen, "Distributed Provers with Applications to Undeniable Signatures," *Proc. of Advances in Cryptology—EUROCRYPT '91*, Lecture Notes in Computer Science 547, Springer-Verlag, 1991, pp. 221-242.
Donn B. Parker, "Chapter 43: Public Key Cryptosystems," *Fighting Computer Crime*, Charles Scribner's Sons, New York, 1983, pp. 327-334.

(56) References Cited

OTHER PUBLICATIONS

John Droge, "Mykotronx Develops New Chip to Protect Digital Data," Press Release, Mykotronx, Inc., Torrence, California, 1992, 3 pp.
Barbara Fox, "Certificate Revocation: Mechanics and Meaning," *Microsoft Corporation, Introductory Remarks for Panel Discussion with J. Feigenbaum, P. Kocher, M. Myers and R. Rivest,*, 1998, 8 pp.
David Mutch, "Electronics Industry Wants to Offer V-Chip of Its Own," *The Christian Science Monitor*, Sep. 25, 1995, 3 pp.
S. Micali and P. Rogaway, "Secure Computation," *Proc. of Advances in Cryptology: CRYPTO '91*, Lecture Notes in Computer Science 576, Springer, 1991, pp. 392-404.
C. Mueller-Scholor and N. R. Wagner, "The implementation of a cryptography-based secure office system," *AFIPS Proc. of the National Computer Conference*, 1982, pp. 487-492.
M. Noar and M. Yung, "Universal One-Way Hash Function and their Cryptographic Applications," ACM 0-89791-307-8, 1989, pp. 33-43.
R. M. Needham and M. D. Schroeder, "Using Encryption for Authentication in Large Networks of Computers," *Communications of the ACM, Operating Systems*, vol. 21, No. 12, Dec. 1978, pp. 993-999.
H. Ong and C.P. Schnorr, "Fast Signature Generation with a Fiat-Shamir-Like Scheme," *Proc. of Advances in Cryptology—EUROCRYPT '90*, Lecture Notes in Computer Science 473, Springer-Verlag, 1991, pp. 432-440.
M. O. Rabin, "Digitalized Signatures and Public-Key Functions as Intractable as Factorization," Technical Report, MIT/LCS/TR-212, Jan. 1979, 17 pp.
Rabin and M. Ben-Or, "Verifiable Secret Sharing and Multiparty Protocols with Honest Majority," ACM 0-89791-307-8, 1989, pp. 73-85.
M. O. Rabin, "Transaction Protection by Beacons," Harvard University Center for Research in Computing Technology, TR-29-81, Nov. 1981, 21 pp.
Michael O. Rabin, "How to Exchange Secrets," May 20, 1981, 21 pp.
E. Rescorla and A. Schiffinan, "The Secure HyperText Transfer Protocol," Internet Draft, *Web Transaction Security Working Group, Enterprise Integration Technologies*, Jul. 1995, 36 pp.
K. Rihaczek, "Teletrust," *Computer Networks and ISDN Systems*, vol. 13, 1987, pp. 235-239.
"Statement by the Press Secretary," *The White House, Office of the Press Secretary*, Apr. 16, 1993. 6 pp.
C. P. Schnorr, "Efficient Identification and Signatures for Smart Cards," *Proc. of Advances in Cryptology—Crypto 89*, G. Brassard (ed.), Lecture Notes in Computer Science 435, Springer-Verlag, 1990, pp. 239-251.
M. Blachere and M. Waidner, "SEMPER," *Project AC026*, Document 43IZR031, 1995, 46 pp.
Bob Serenelli and Tim Leisher, "Securing Electronic Mail Systems," *Communications—Fusing Command, Control and Intelligence, MILCOM '92*, Conference Record, vol. 2, 1992, pp. 677-680.
A. Shamir, "How to Share a Secret," *Programming Techniques, Communications of the ACM*, vol. 22, No. 11, Nov. 1979, pp. 612-613.
A. Shamir, "Identity-based cryptosystems and signature schemes," *Proc. of Advances in Cryptology, CRYPTO 84*, G. R. Blakley and D. Chaum (Eds.), Springer-Verlag, 1985, pp. 47-53.
*Contemporary Cryptology*, G. J. Simmons (Ed.), IEEE Press, New York, 1991, pp. 348-350, 617-630.
G. J. Simmons, "How to (Really) Share a Secret," *Proc. of Advances in Cryptology—Crypto 88*, S. Goldwasser (ed.), Lecture Notes in Computer Science 403, Springer-Verlag, 1988, pp. 390-448.
G. J. Simmons, "An Impersonation-Proof Identify Verification Scheme," *Proc. of Advances in Cryptology—Crypto 87*, C. Pomerance (Ed.), Lecture Notes in Computer Science 293, Springer-Verlag, 1987, pp. 211-215.
G. J. Simmons, "A Protocol to Provide Verifiable Proof of Identity and Unforgeable Transaction Receipts," IEEE Journal on Selected Areas in Communications, vol. 7, No. 4, May 1989, pp. 435-447.
G. J. Simmons, "Scanning the Issue," and "How to Insure that Data Acquired to Verify Treaty Compliance are Trustworthy," *Proc. of the IEEE*, vol. 76, No. 5, May 1988, pp. 515-518 and 621-627.
G. J. Simmons, "A System for Verifying User Identity and Authorization at the Point-of Sale or Access," Cryptologia, vol. 8, No. 1, Jan. 1984, 21 pp.
G. J. Simmons and G. B. Purdy, "Zero-Knowledge Proofs of Identity and Veracity of Transaction Receipts," *Proc. of Advances in Cryptology—Eurocrypt '88*, Lecture Notes in Computer Science 330, C. G. Gunther (Ed.), Springer-Verlag New York, 1988, pp. 35-49.
M. Sirbu and J. D. Tygar, "NetBill: An Internet Commerce System Optimized for Network Delivered Services," *IEEE Personal Communications*, Aug. 1995, 13 pp.
J. L. Snare, "Secure Electronic Data Interchange," *Computer Security in the Age of Information*, W. J. Caelli (Ed.), Elsevier Science Publishers B.V., 1989, pp. 331-342.
K. R. Sollins, "Cascaded Authentication," *Proc. of the 1988 IEEE Symposium on Security and Privacy*, 1988, pp. 156-163.
M. Stadler, et al., "Fair Blind Signatures," *Proc. of Advances in Cryptology—Eurocrypt '95*, Lecture Notes in Computer Science 921, Springer-Verlag, 1995, pp. 209-219.
L. H. Stein, et al., "The Green Commerce Model," Internet Draft, Oct. 1994, 18 pp.
G. Tsudik, "Zurich iKP Prototype (ZiP): Protocol Specification Document," *IBM Zurich Research Lab*, Mar. 5, 1996, 30 pp.
V. Varadharajan and S. Black, "Formal Specification of a Secure Distributed Messaging System," *Proc. of the 12th National Computer Security Conference*, Oct. 1989, pp. 146-171.
M. Waidner, "Development of a Secure Electronic Marketplace for Europe," *Proc. of ESORICS 96*, Rome, Sep. 1996, 15 pp.
M. Wegman, "One-Time Pad Digitial Signature Technique," *IBM Technical Disclosure Bulletin*, vol. 21, No. 3, Aug. 1978, pp. 1316-1318.
H. C. Williams, "A Modification of the RSA Public-Key Encryption Procedure," *IEEE Transactions on Information Theory*, vol. IT-26, No. 6, Nov. 1980, pp. 726-729.
A. C. Yao, "Protocols for Secure Computations," *Proc. of the 23rd Symp. on Foundation of Computer Science*, IEEE, 1982, pp. 160-164.
Zhou and D. Gollman, "A Fair Non-repudiation Protocol," *Proc. of the 1996 IEEE Symposium on Security and Privacy*, 1996, pp. 55-61.
U.S. Appl. No. 09/617,050, filed Jul. 14, 2000, Sudia.
U.S. Appl. No. 09/633,149, filed Aug. 4, 2000, Sudia.
Hauser R. et al.; "*Lowering Security Overhead in Link State Routing*"; Computer Networks, Elsevier Science Publishers B.V., Amsterdam, NL, vol. 31, No. 8; pp. 885-894 (Apr. 23, 1999).
Bruce Schneier; "*Applied cryptography second edition*"; John Wiley & Sons, Inc., USA; pp. 574-576 (1996).
Menezes, Vanstone, Oorschot, "Handbook of Applied Cryptography" 1997, CRC Press LLC, USA, XP000864277, pp. 395-397 and 559-561.

\* cited by examiner

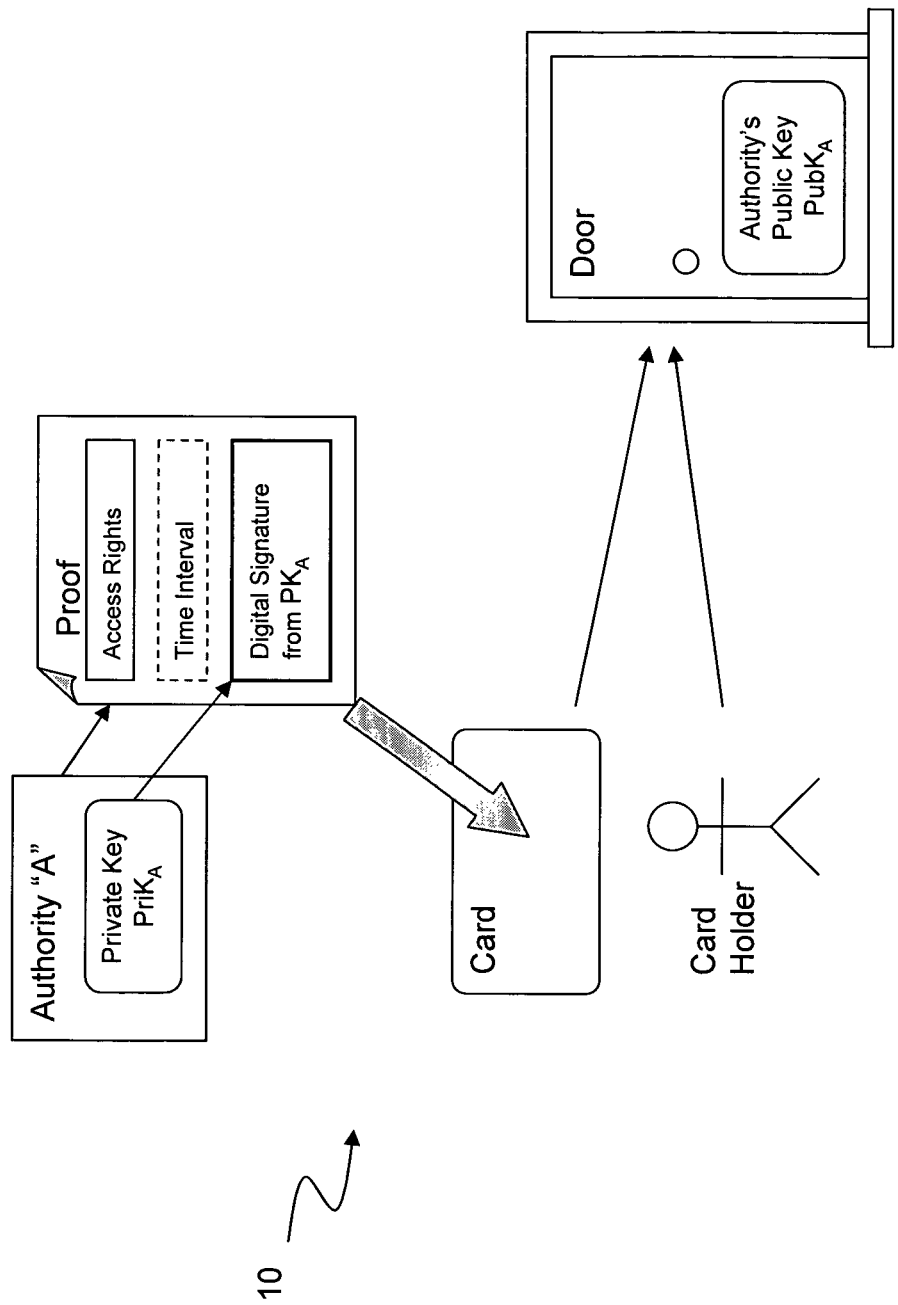

SCALABLE CERTIFICATE VALIDATION AND SIMPLIFIED PKI MANAGEMENT

CROSS-REFERENCE TO RELATED APPLICATIONS

This application is a continuation in part application of U.S. patent application Ser. No. 09/915,180, filed Jul. 25, 2001 now U.S. Pat. No. 6,766,450, entitled CERTIFICATE REVOCATION SYSTEM which is incorporated by reference and which is a continuation of U.S. application Ser. No. 09/483,125, filed Jan. 14, 2000 now U.S. Pat. No. 6,292,893 which is a continuation of U.S. patent application Ser. No. 09/356,745 filed Jul. 19, 1999 now abandoned which is a continuation of U.S. patent application Ser. No. 08/823,354, filed Mar. 24, 1997, now U.S. Pat. No. 5,960,083, which is a continuation of U.S. patent application Ser. No. 08/559,533, filed Nov. 16, 1995, now U.S. Pat. No. 5,666,416, which is based on U.S. provisional patent application No. 60/006,038, filed Oct. 24, 1995. This application is also a continuation in part application of U.S. application Ser. No. 08/992,897 filed Dec. 18, 1997 now U.S. Pat. No. 6,487,658 which is incorporated by reference and which is based on U.S. provisional patent application No. 60/033,415, filed Dec. 18, 1996 and which is a continuation in part of U.S. patent application Ser. No. 08/715,712, filed Sep. 19, 1996, entitled CERTIFICATE REVOCATION SYSTEM, Abandoned, which is based on U.S. Patent Application No. 60/004,796, filed Oct. 2, 1995, entitled CERTIFICATE REVOCATION SYSTEM. U.S. application Ser. No. 08/992,897 is also a continuation in part of U.S. patent application Ser. No. 08/729,619, filed Oct. 11, 1996, entitled TREE-BASED CERTIFICATE REVOCATION SYSTEM, now U.S. Pat. No. 6,097,811, which is based on U.S. Patent Application No. 60/006,143, filed Nov. 2, 1995, entitled Tree Based CERTIFICATE REVOCATION SYSTEM. U.S. application Ser. No. 08/992,897 is also a continuation in part of U.S. patent application Ser. No. 08/804,868, filed Feb. 24, 1997, entitled Tree-Based CERTIFICATE REVOCATION SYSTEM, Abandoned, which is a continuation of U.S. patent application Ser. No. 08/741,601, filed Nov. 1, 1996, entitled TREE-BASED CERTIFICATE REVOCATION SYSTEM, Abandoned, which is based on U.S. Patent Application No. 60/006,143, filed Nov. 2, 1995, entitled TREE-BASED CERTIFICATE REVOCATION SYSTEM. U.S. application Ser. No. 08/992,897 is also a continuation in part of U.S. patent application Ser. No. 08/872,900, filed Jun. 11, 1997, entitled WITNESS BASED CERTIFICATE REVOCATION SYSTEM, Abandoned, which is a continuation of U.S. patent application Ser. No. 08/746,007, filed Nov. 5, 1996, entitled CERTIFICATE REVOCATION SYSTEM, now U.S. Pat. No. 5,793,868, which is based on U.S. Patent Application No. 60/025,128, filed Aug. 29, 1996, entitled CERTIFICATE REVOCATION SYSTEM. U.S. application Ser. No. 08/992,897 is also a continuation in part of U.S. Patent Application No. 60/035,119, filed Feb. 3, 1997, entitled CERTIFICATE REVOCATION SYSTEM and is also a continuation in part of U.S. patent application Ser. No. 08/906,464, filed Aug. 5, 1997, entitled WITNESS BASED CERTIFICATE REVOCATION SYSTEM, Abandoned, which is a continuation of U.S. patent application Ser. No. 08/763,536, filed Dec. 9, 1996, entitled WITNESS BASED CERTIFICATE REVOCATION SYSTEM, now U.S. Pat. No. 5,717,758, which is based on U.S. Patent Application No. 60/024,786, filed Sep. 10, 1996, entitled WITNESS BASED CERTIFICATE REVOCATION SYSTEM, and is also a continuation in part of U.S. patent application Ser. No. 08/636,854, filed Apr. 23, 1996, now U.S. Pat. No. 5,604,804, and U.S. Patent Application No. 60/025,128, filed Aug. 29, 1996, entitled CERTIFICATE REVOCATION SYSTEM. U.S. application Ser. No. 08/992,897 is also a continuation in part of U.S. patent application Ser. No. 08/756,720, filed Nov. 26, 1996, entitled SEGMENTED CERTIFICATE REVOCATION LISTS, Abandoned, which is based on U.S. Patent Application No. 60/025,128, filed Aug. 29, 1996, entitled CERTIFICATE REVOCATION SYSTEM, and is also a continuation in part of U.S. patent application Ser. No. 08/715,712, filed Sep. 19, 1996, entitled CERTIFICATE REVOCATION SYSTEM, Abandoned, and is also a continuation in part of U.S. patent application Ser. No. 08/559,533, filed Nov. 16, 1995, now U.S. Pat. No. 5,666,416. U.S. application Ser. No. 08/992,897 is also a continuation part of U.S. patent application Ser. No. 08/752,223, filed Nov. 19, 1996, entitled CERTIFICATE ISSUE LISTS, now U.S. Pat. No. 5,717,757, which is based on U.S. Patent Application No. 60/025,128, filed Aug. 29, 1996, entitled CERTIFICATE REVOCATION SYSTEM and is also a continuation in part of U.S. patent application Ser. No. 08/804,869, filed Feb. 24, 1997, entitled TREE-BASED CERTIFICATE REVOCATION SYSTEM, Abandoned, which is a continuation of U.S. patent application Ser. No. 08/741,601, filed Nov. 1, 1996, entitled TREE-BASED CERTIFICATE REVOCATION SYSTEM, Abandoned, which is based on U.S. Patent Application No. 60/006,143, filed Nov. 2, 1995, entitled TREE-BASED CERTIFICATE REVOCATION SYSTEM. U.S. application Ser. No. 08/992,897 is also a continuation in part of U.S. patent application Ser. No. 08/823,354, filed Mar. 24, 1997, entitled CERTIFICATE REVOCATION SYSTEM, now U.S. Pat. No. 5,960,083, which is a continuation of U.S. patent application Ser. No. 08/559,533, filed Nov. 16, 1995, entitled CERTIFICATE REVOCATION SYSTEM, now U.S. Pat. No. 5,666,416, which is based on U.S. Patent Application No. 60/006,038, filed Oct. 24, 1995, entitled ENHANCED CERTIFICATE REVOCATION SYSTEM. This application is also based on U.S. Provisional Application No. 60/277,244 filed Mar. 20, 2001 and U.S. Provisional Application No. 60/300,621 filed Jun. 25, 2001 and U.S. Provisional Application No. 60/344,245 filed Dec. 27, 2001, all of which are incorporated by reference herein.

BACKGROUND OF THE INVENTION

1. Field of the Invention

This application relates to the field of digital certificates and more particularly to the field of management of digital certificates.

2. Description of Related Art

In essence, a digital certificate C consists of a CA's digital signature securely binding together several quantities: SN, a serial number unique to the certificate, PK, the public key of the user, U, the user's identifier, $D_1$, the issue date, $D_2$, the expiration date, and additional fields. In symbols, $C=SIG_{CA}(SN, PK, U, D_1, D_2, \ldots)$.

It is widely recognized that digital certificates provide the best form of Internet authentication. On the other hand, they are also difficult to manage. Certificates may expire after one year (i.e., $D_2-D_2=1$ year). However, they may be revoked prior to their expiration; for instance, because their holders leave their companies or assume different duties within them. Thus, each transaction enabled by a given digital certificate needs a suitable proof of the current validity of that certificate, and that proof often needs to be archived as protection against future claims.

Unfortunately, the technologies used today for proving the validity of issued certificates do not scale well. At tomorrow's volume of digital certificates, today's validity proofs will be either too hard to obtain in a secure way, or too long and thus too costly to transmit (especially in a wireless setting). Certificate validation is universally recognized as a crucial problem. Unless efficiently solved, it will severely limit the growth and the usefulness of our PKIs.

Today, there are two main approaches to proving certificates' validity: Certificate Revocation Lists (CRLs) and the Online Certificate Status Protocol (OCSP).

CRLs

CRLs are issued periodically. A CRL essentially consists of a CA-signed list containing all the serial numbers of the revoked certificates. The digital certificate presented with an electronic transaction is then compared to the most recent CRL. If the given certificate is not expired but is on the list, then everyone knows from the CRL that the certificate is not valid and the certificate holder is no longer authorized to conduct the transaction. Else, if the certificate does not appear in the CRL, then the certificate is deduced to be valid (a double negative).

CRLs have not found much favor; for fear that they may become unmanageably long. (A fear that has been only marginally lessened by more recent CRL-partition techniques.) A few years ago, the National Institute of Standards and Technology tasked the MITRE Corporation [3] to study the organization and cost of a Public Key Infrastructure (PKI) for the federal government. This study concluded that CRLs constitute by far the largest entry in the Federal PKI's cost list.

OCSP

In the OCSP, a CA answers a query about a certificate C by returning its own digital signature of C's validity status at the current time. The OCSP is problematic in the following areas.

Bandwidth. Each validity proof generated by the OCSP has a non-trivial length. If RSA or other factoring based signature schemes are used, such a proof in fact requires at a minimum 2,048 bits for the CA's signature.

Computation. A digital signature is a computationally complex operation. In certain large applications, at peak traffic, the OCSP may require computing millions of signatures in a short time, which is computationally very expensive to do.

Communication (if centralized). Assume a single validation server implements the OCSP in a centralized manner. Then, all certificate-validity queries would have, eventually, to be routed to it, and the server will be a major "network bottleneck" causing considerable congestion and delays. If huge numbers of honest users suddenly query the server, a disrupting "denial of service" will probably ensue.

Security (if distributed). In general, distributing the load of a single server across several (e.g., 100) servers, strategically located around the world, alleviates network congestion. In the OCSP case, however, load distribution introduces worse problems than those it solves. In order to sign its responses to the certificate queries it receives, each of the 100 servers should have its own secret signing key. Thus, compromising any of the 100 servers is compromising the entire system. Secure vaults could protect such distributed servers, but at great cost.

BRIEF SUMMARY OF THE INVENTION

According to the present invention, managing a digital certificate includes a landlord providing a digital certificate, a secure hardware device generating a series of n hash values, the secure hardware device providing an nth hash value to the landlord, wherein other hash values are not readily available to the landlord, the landlord placing the nth hash value in the certificate, the landlord digitally verifying the certificate containing the nth hash value to obtain a digitally signed certificate, a tenant obtaining the digitally signed certificate, the tenant obtaining the n hash values and the tenant managing the certificate by periodically issuing a previous hash value in the series of n hash values in response to the certificate being valid when the previous hash value is issued.

BRIEF DESCRIPTION OF DRAWINGS

The sole FIGURE is a schematic diagram showing a card holder, a door, a card, a proof, and an authority used in connection with the system described herein.

DETAILED DESCRIPTION OF THE INVENTION

The system described herein works with standard certificate formats (e.g., X.509v3) and enables a CA to prove the validity status of each certificate C at any time interval (e.g., every day, hour, or minute) starting with C's issue date, $D_1$. C's time granularity may be specified within the certificate itself, unless it is the same for all certificates. To be concrete, but without limitation intended, below we assume a one-day granularity for all certificates, and that each certificate expires 365 days after issuance.

One-way hashing. The system described herein uses a one-way function H, in particular a one-way hash function such as SHA [4]. Typically, such a function H enjoys the following properties:

1. H is at least 10,000 times faster to compute than a digital signature;
2. H produces 20-byte outputs, no matter how long its inputs; and
3. H is hard to invert: given Y, finding X such that $H(X)=Y$ is practically impossible.

Of course, there is nothing magic about these specific properties. The schemes herein may work even if H had different speed, or different size outputs

The Basic System

Making a certificate C. In addition to traditional quantities such as a serial number SN, a public key PK, a user name U, an issue date $D_1$, an expiration date $D_2$ ($=D_1+365$), a certificate C also includes two 20-byte values unique to it. Specifically, before issuing a certificate C, a CA randomly selects two different 20-byte values, $Y_0$ and $X_0$, and from them computes two corresponding 20-byte values, $Y_1$ and $X_{365}$, as follows. Value $Y_1$, is computed by hashing $Y_0$ once: $Y_1=H(Y_0)$; and $X_{365}$ by hashing $X_0$ 365 times: $X_1=H(X_0)$, $X_2=H(X_1)$, ..., $X_{365}=H(X_{364})$. Because H always produces 20-byte outputs, $Y_1$, $X_{365}$, and all intermediate values $X_j$ are 20-byte long. The values $Y_0$, $X_0$, $X_1$, ..., $X_{364}$ are kept secret, while $Y_1$, and $X_{365}$ are included in the certificate: $C=SIG_{CA}(SN, PK, U, D_1, D_2, ..., Y_1, X_{365})$. We shall call $Y_1$, the revocation field and $X_{365}$ the validity field.

Revoking and validating a not-yet-expired certificate C. On the i-th day after C's issuance (i.e., on day $D_1+i$), the CA computes and releases a 20-byte proof of status for C as follows. If C is revoked, then, as a proof of C's revocation, the CA releases $Y_0$, that is, the H-inverse of the revocation field $Y_1$. Else, as a proof of C's validity on that day, the CA releases $X_{365-i}$, that is, the i-th H-inverse of the validity field $X_{365}$.

(E.g., the proof that C is valid 100 days after issuance consists of $X_{265}$.) The CA may release $Y_0$ or $X_{365-i}$ by providing the value in response to a query or by posting it on the World Wide Web.

Verifying the status of a not-yet-expired certificate C. On any day, C's revocation proof, $Y_0$, is verified by hashing $Y_0$ once and checking that the result equals C's revocation field, $Y_1$. (I.e., the verifier tests for himself that $Y_0$ really is the H-inverse of $Y_1$.) Note that $Y_1$ is guaranteed to be C's revocation field, because $Y_1$ is certified within C. On the i-th day after C's issuance, C's validity proof on that day, $X_{365-i}$, is verified by hashing i times the value $X_{365-i}$ and checking that the result equals C's validity field, $X_{365}$. (I.e., the verifier tests for himself that $X_{365-i}$ really is the i-th H-inverse of $X_{365}$.) Note that a verifier knows the current day D as well as C's issuance date $D_1$ (because $D_1$ is certified within C), and thus immediately computes i=D-$D_1$.

Of course. The system described herein can use different functions H rather than a single one. For instance, $H_1$ to produce $X_1$ from $X_0$, $H_2$ to produce $X_2$ from $X_1$ and so on. Alternatively, additional inputs (e.g., part of the to be certificate, such a serial number, or the iteration number) can be given each time H is applied.

Security

A Proof of Revocation Cannot be Forged.

The proof of revocation of a certificate C consists of the H-inverse of C's revocation field $Y_1$. Because H is essentially impossible to invert, once a verifier checks that a given 20-byte value $Y_0$ is indeed C's proof of revocation, it knows that $Y_0$ must have been released by the CA. In fact, only the CA can compute the H-inverse of $Y_1$: not because the CA can invert H better than anyone else, but because it computed $Y_1$ by starting with $Y_0$ and hashing it. Because the CA never releases C's revocation proof as long as C remains valid, an enemy cannot fake a revocation proof.

A Proof of Validity Cannot be Forged.

On day i, the proof of validity of a certificate C consists of the i-th H-inverse of C's validity field $X_{365}$. Because H is essentially impossible to invert, once a verifier checks that a given 20-byte value $X_{365-i}$ is indeed C's proof of validity on day i, it knows that the CA must have released X365-i. In fact, only the CA can compute the i-th H-inverse of $X_{365}$: not because the CA can invert H better than anyone else, but because it computed $X_{365}$ by starting with $X_0$ and hashing it 365 times, thus computing along the way all the first 365 inverses of $X_{365}$. If certificate C become revoked on day i+1, the CA has already released the values X365-1, ..., $X_{365-i}$ in the preceding i days (when C was still valid) but has not released and will never release the value $X_{365-i-1}$ (or any other value $X_j$ for j<365-i) in the future. Consequently, to forge C's validity proof on day i+1, an enemy should compute on his own the i+1st H-inverse of $X_{365}$ (i.e., the H-inverse of $X_{365-i}$), which is very hard to do. Similarly, an enemy cannot compute a validity proof for C on any day after i+1. To do so, it should again be able to invert H on input $X_{365-i}$. For instance, if it could compute C's validity proof on day i+2, $X_{362-i-2}$, then by hashing it once it would easily obtain $X_{365-i-1}$, the H-inverse of $X_{365-i}$.

Efficiency

A Certificate C Includes Only Two Additional 20-byte Values, $Y_1$ and $X_{365}$.

This is a negligible cost. Recall that C already consists of a CA signature (at least 2048-bit long) of data that includes a public key PK (at least 1034-bit long), and that C may include comments and plenty of other data in addition to SN, PK, U, $D_1$ and $D_2$.

Generating $Y_1$ and $X_{365}$ Requires only 366 Hashings Total.

This too is a negligible cost. Recall that issuing a certificate already requires computing a signature.

Proofs of Revocation and Proofs of Validity are Only 20-bytes Long.

Our 20-byte proofs are trivial to transmit and trivial to store, making the 20-byte technology ideal for wireless applications (because here bandwidth is still limited, and so is the storage capacity of many cellular phones and other wireless devices).

Proofs for the system described herein can be so short because they derive their security from elementary cryptographic components, such as one-way functions, which should exhibit an exponential amount of security. (Quite differently, digital signature schemes have complex security requirements. Their typical number-theoretic implementations offer at best a sub-exponential amount of security, and thus necessitate much longer keys.)

Proofs for the system described herein remain 20-bytes long whether the total number of certificates is a few hundred or a few billion. In fact there are $2^{160}$ possible 20-byte strings, and the probability that two certificates may happen to have a common proof of revocation or validity is negligible.

Note too that the length of our 20-byte proofs does not increase due to encryption or authentication. The 20-byte proofs of the system described herein are intended to be public and thus need not be encrypted. Similarly, the 20-byte proofs are self-authenticating: by hashing them the proper number of times they yield either the validity field or the revocation field specified within the certificate. They will not work if faked or altered, and thus need not be signed or authenticated in any manner.

Finally, a 20-byte proof of validity on day i, $X_{365-i}$, need not additionally include the value i: in a sense, it already includes its own time stamp. Indeed, as discussed before, i is the difference between the current day and the certificate's issue day, and if hashing $X_{365-i}$ i times yields the validity field of certificate C, then this proves that $X_{365-i}$ is C's proof of validity on day i.

The 20-byte Proofs are Computed Instantly.

A proof of revocation $Y_0$ or a proof of validity $X_{365-i}$ is just retrieved from memory. (Alternatively, each $X_{365-i}$ could be recomputed on the fly on day i; for instance by at most 364 hashings, if just $X_0$ is stored during certificate issuance. Surprisingly more efficient strategies are discussed in the next section.)

Wireless

The system described herein is ideal for wireless implementations. Its scalability is enormous: it could accommodate billions of certs with great ease. The bandwidth it requires is negligible, essentially a 30-bit serial number for the query and 20-byte for the response. The computation it requires is negligible, because a certificate-status query is answered by a single table look-up and is immediately verified. Of course, great scalability, minimum bandwidth and trivial computation make the system described herein the technology of choice in a wireless environment.

OCSP Comparison

The system described herein and OCSP are both on-demand systems: namely, a user sends a query about the current validity of a certificate and gets back an unforgeable and universally verifiable proof as a response. But there are differences in
1) Time accuracy;
2) Bandwidth;
3) CA efficiency;
4) Security; and
5) Operating costs.

Time Accuracy

In principle, an OCSP response may specify time with unbounded accuracy, while a response for the system described herein specifies time with a predetermined accuracy: one day, one hour, one minute, etc. In low-value applications, one-day validity is plenty acceptable. For most financial applications, Digital Signature Trust considers a 4-hour accuracy sufficient. (Perhaps this is less surprising than it seems: for most financial transactions, orders received in the morning are executed in the afternoon and orders received in the afternoon are executed the next business day.) In any event, time is not specified by a real number with infinitely many digits. In an on-demand validation system, a time accuracy of less than one minute is seldom meaningful, because the clocks of the querying and answering parties may not be that synchronized. Indeed, in such a system, a time accuracy of 15 seconds is de facto real time.

To handle such an extreme accuracy, the system described herein computes hash chains that are roughly 1M long (i.e., needs to compute validity fields of the type $X_{1M}$), because there are at most 527,040 minutes in a year. If chains so long could be handled efficiently, the system described herein would de facto be real time. Computing 1M hashings is not problematic at certificate issuance: 1M hashings can be performed in less than 1 second even using very reasonable platforms, and a certificate is typically issued only once a year, and not under tremendous time pressure. Similarly, 1 second of computation is not problematic for the verifier of a cert validity proof (e.g., a merchant relying on the certificate) considering that he generally focuses just on an individual transaction, and has more time at hand. Computing 1M hashings per certificate-status request would, however, affect the performance of the server producing validity proofs, because it typically handles many transactions at a time. Fortunately, this server needs not to compute all these hashings on-line starting with $X_0$, but by table look up—capitalizing on having in storage the full hash-chain of every certificate. Nonetheless, storing 1M-long hash-chains may be a problem in applications with huge numbers of certificates. But, fortunately, as we shall mention later on, even ordinary servers can, using better algorithms, re-compute 1M-long hash chains with surprising efficiency.

Bandwidth

The system described herein has an obvious bandwidth advantage over OCSP. The former uses 20-byte answers, while the latter typically uses 256 bytes.

CA Efficiency

A validity query is answered by a (complex) digital signature in the OCSP case, and by a (trivial) table look-up in the case of the system described herein, as long as the CA stores the entire X-chain for each certificate.

Note that, with a population of 1 million certificates, the CA can afford to store the entire X-chain for each certificate when the time accuracy is one day or one hour. (In the first case, the CA would have to store 365 20-bytes values; that is, 7.3K bytes per cert, and thus 7.3B bytes overall. In the second case, 175.2B bytes overall.) If the time accuracy were 15 seconds, then each hash chain would consist of 1M 20-byte values, and for the entire system the overall storage requirement would be around 10.5 tera-bytes: a sizable storage.

To dramatically decrease this storage requirement, the CA may store just a single 20-byte value (i.e., $X_0$) for each cert, and re-compute from it each $X_i$ value by at most 1M hashings. Alternatively, Jacobsson [5] has found a surprising time/storage tradeoff. Namely, the CA may re-compute all n $X_i$ values, in the right order, by storing log (n) hash values and performing log(n) hashings each time. If n were 1M, this implies just storing 20 hash values per cert and performing only 20 hashings each time the cert needs validation. Other non-trivial tradeoffs are possible.

In sum, even in a de facto real-time application (i.e., using a 15-second time accuracy) the system described herein can, by just storing 400 bytes per cert, replace a complex digital signature operation with a trivial 20-hash operation.

Security And Operating Costs

The last two differences are better discussed after specifying the type of implementation of the system described herein and OCSP under consideration.

Security Analysis of Centralized Systems

Whenever proving certificate validity relies on the secrecy of a given key, a secure vault ought to protect that key, so as to guarantee the integrity of the entire system. By a centralized implementation of the system described herein or OCSP, we mean one in which a single vault answers all validity queries. Centralized implementations are preferable if the number of deployed certificates is small (e.g., no more than 100K), so that the vault could handle the query volumes generated even if almost all certificates are used in a small time interval, triggering almost simultaneous validity queries. In such implementations, the system described herein is preferable to OCSP in the following respects.

Centralized System Offers Better Doomsday Protection

In the traditional OCSP, if (despite vaults and armored guards) an enemy succeeds in penetrating the vault and compromises the secret signing key, then he can both "resurrect" a previously revoked certificate and "revoke" a still valid one. (Similarly, if the CRL signing key is compromised in a CRL system.) By contrast, in the system described herein penetrating the secure vault does not help an adversary to forge the validity of any previously revoked certificate. In fact, when a certificate becomes revoked at day i, not only is its revocation proof $Y_0$ made public, but, simultaneously, all its $X_i$ values (or at least the values $X_0$ through $X_{365-i}$) are deleted. Therefore, after a successful compromise, an enemy finds nothing that enables him to "extend the validity" of a revoked certificate. To do so, he should succeed in inverting the one-way hash H on $X_{365-i}$ without any help, which he is welcome to try (and can indeed try without entering any secure vault). The worst an enemy can do in the system described herein after a successful compromise is to fake the revocation of valid certificates, thus preventing honest users from authenticating legitimate transactions. Of course, this would be bad, but not as bad as enabling dishonest users to authenticate illegitimate transactions.

Security and Operating-Cost Analysis for Distributed Systems

Centralized implementations of systems require all queries about certificate validity to be routed to the same vault. This easily results in long delays and denial of service in applications with millions of active certificates. To protect against such congestion, delays, and denial of service, one might spread the load of answering validity queries across several, geographically dispersed, responder servers. However, in the case of the OCSP each additional responder needs to have a secret signing key, and thus needs to be hosted in a vault, making the cost of ownership of an OCSP system very onerous. A high-grade vault meeting the requirements of financial institutions costs at least $1M to build and $1M to run. (A good vault would involve armored concrete, steel doors, back-up power generators, protected fuel depot to run the generator for potentially a long time, etc. Operating it would involve a minimum of 4 different teams for 24X7X365 operations, plus managerial supervision, etc.) In an application requiring 10 such vaults to guarantee reasonably fast response at peak traffic, the cost of ownership of the OCSP system would be $10M of initial investment and an ongoing budget of $10M/year. Even if less secure vaults and operations were used, millions of dollars in initial and ongoing costs would still be necessary.

In the case of the system described herein, however, a distributed implementation can be achieved with a single vault (which a CA would have anyway) and an arbitrary number of "untrusted responders" (i.e., ordinary servers). Let us see the exact details of a distributed system assuming, to be concrete, that (a) there are 10 M certs; (b) there are 1,000 servers, strategically located around the globe so as to minimize response time; and (3) the time granularity is one-day.

Distributed CA Operations (Initialization Cost)

Every morning: Starting with the smallest serial number, compile a 10M-entry array F as follows: For each certificate C having serial number j, store C's 20-byte validity/revocation proof in location j. Then, date and sign F and send it to each of the 1,000 servers.

Distributed User Operations (Query Cost)

To learn the status of a certificate C, send C's serial number, j, (and CA ID if necessary) to a server S.

Distributed Server Operations (Answer Cost)

Every morning: If a properly dated and signed array F is received, replace the old array with the new one.
At any time: answer a query about serial number j by returning the 20-byte value in location j of the current F.

Distributed Works

1. Preparing Array F is Instantaneous.
If the whole hash chain is stored for each cert, then each entry is computed by a mere table look-up operation. (Else, it can be computed on the spot by using Reyzin's method.)

2. F Contains no Secrets.
It consists of the accurate and full account of which certificates are still valid and which revoked. (The CA's goal is indeed making this non-secret information as public as possible in the most efficient manner)
3. Transferring F to the Servers is Straighforward.
This is so because F contains no secrets, requires no encryption, and poses no security risks. Though 10M certs are a lot, sending a 200M-byte file to 1000 servers at regular intervals is very doable.
4. Each Server Answer is 20-byte Long.
Again, each answer requires no encryption, signature or time stamp.
5. No Honest Denial of Service.
Because each value sent is just 20-byte long, because each such a value is immediately computed (by a table look up), and because the traffic can be spread across 1000 servers, no denial of service should occur, at least during legitimate use of the system.
6. Servers Need Not be Trusted.
They only forward 20-byte proofs received by the CA. Being self-authenticating, these proofs cannot be altered and still hash to the relevant fields.

Distributed System Offers Better CA Security

A distributed system like that described herein continues to enjoy the same doomsday protection of its centralized counterpart: namely, an enemy successfully entering the vault cannot revive a revoked certificate. Sophisticated adversaries, however, refrain from drilling holes in a vault, and prefer software attacks whenever possible. Fortunately, software attacks, though possible against the distributed/centralized OCSP, cannot be mounted against a distributed version of the system described herein.

In the OCSP, in fact, the CA is required to receive outside queries from untrusted parties, and to answer them by a digital signature, and thus by means of its precious secret key. Therefore, the possibility exists that OCSP's required "window on the outside world" may be maliciously exploited for exposing the secret signing key.

By contrast, in a distributed version of the system described herein there are no such "windows:" the CA is in the vault and never receives or answers any queries from the outside; it only outputs non-secret data at periodic intervals. Indeed, every day (or hour) it outputs a file F consisting of public information. (The CA may receive revocations requests from its RAs, but these come from fewer trusted entities via authenticated channels—e.g., using secure smart cards.) The untrusted responders do receive queries from untrusted parties, but they answer those queries by means of their file F, and thus by public data. Therefore, in a software attack against the system described herein ordinary responders may only "expose" public information.

Simplified PKI Management

PKI management (e.g., [7] [8]) is not trivial. The system described herein may improve PKI management in many applications by
  Reducing the number of issued certs;
  Enabling privilege management on the cert; and
  Sharing the registration function with multiple independent CAs.
Let us informally explain these improvements in PKI management in a series of specific examples. (Note that features and techniques used in one example can be easily embedded in another. We do not explicitly do this to avoid discussing an endless number of possible variations.)

Turning a Certificate ON/OFF (and Suspending it)

Example 1

Music Downloading

Assume an Internet music vendor wishes to let users download any songs they want, from any of its 1000 servers, for a $1/day fee. This can be effectively accomplished with digital certificates. However, in this example, U may be quite sure that he will download music a few days of the year, yet he cannot predict which or how many these days will be. Thus the Music Center will need to issue for U a different one-day certificate whenever U so requests: U requests such a certificate and, after payment or promise of payment, he receives it and then uses with any of the 1000 music servers on that day. Issuing a one-day cert, however, has non-trivial management costs both for the vendor and the user. And these costs must be duplicated each time the user wishes to enjoy another "music day."

The system described herein can alleviate these costs as follows. The first time that U contacts the vendor, he may be issued a certificate C with issue date $D_1=0$, expiration date $D_2=365$, and a validity field $X_{365}$, a revocation field $Y_1$, and a suspension field $Z_{365}$. (The vendor's CA builds the suspension field very much as a validity field: by starting with a random 20-byte value $Z_0$ and then hashing it 365 times, in case of one-day granularity. It then stores the entire hash chain, or just $Z_0$, or uses a proper time/storage method to be able to generate any desired $Z_i$.) At day $i=1, \ldots, 365$, if U requests "a day of music" for that day, then the vendor simply releases the 20-byte value $X_{365-i}$ to indicate that the certificate is valid. Else, it releases $Z_{365-i}$ to indicate that the certificate is "suspended." Else, it releases $Y_0$ to indicate that the certificate is revoked. Optionally, if U and the music vendor agree to—say—a "week of music starting at day i," then either the 20-byte values for those 7 days are released at the proper time, or the single 20-byte value $X_{365-i-7}$ is released at day i.

That is, rather than giving U a new single-day certificate whenever U wishes to download music, the vendor gives U a single, yearly certificate. At any time, this single certificate can be turned ON for a day, by just releasing the proper 20-byte value. Thus, for instance, the system described herein replaces issuing (and embedding in the user's browser) 10 single-day certificates by issuing a single yearly cert that, as it may happen, will be turned ON for 10 out of the 365 days of the year. The vendor could also use the method above to issue a cert that specifies a priori the number of days for which it can be turned ON (e.g., a 10-day-out-of 365 cert). Because it has a more predictable cost, such certs are more suitable for a gift.

Turning ON/OFF Many Certificates for the Same User

Example 2

Security-Clearance Management

Digital certificates work really well in guaranteeing that only proper users access certain resources. In principle, privileges could be specified on the cert itself. For instance, the State Department may have 10 different security-clearance levels, L1, . . . L10, and signify that it has granted security level 5 to a user U by issuing a certificate C like $$C=SIG_{SD}(SN,PK,U,L5,D_1,D_2,\ldots)$$

Where again $D_1$ and $D_2$, represent the issue and expiration dates.

However, specifying privileges on the cert itself may cause a certificate-management nightmare: whenever its privileges change, the cert needs to be revoked. Indeed, the security level of an employee may vary with his/her assignment, which often changes within the same year. For instance, should U's security-clearance level be temporarily upgraded to 3, then the State Department should revoke the original C and issue a new cert C'. This task could be simplified somewhat by having U and thus C' retain the same public key (and expiration date) as before; for instance, by having $$C'=SIG_{SD}(SN',PK,U,L3,D_1',D_2,\ldots).$$

However, U still faces the task of "inserting" the new C' into his browser in a variety of places: his desk-top PC, his lat-top, his cell phone, his PDA, etc. Now, having the CA take an action to re-issue a certificate in a slightly different form is one thing, but counting on users to take action is a totally different thing.

This management problem is only exacerbated if short-lived certificates (e.g. certificates expiring one day after issuance) are used. In the context of the present example, single-day certs may enable a State Department employee or user U to attend a meeting where a higher security level is needed. (If U had such a cert in a proper cellular device, smart card or even mag stripe card, he could, for instance, use it to open the door leading to the meeting that day.) The use of short-lived certificates is much broader, and has been advocated because it dispenses with the difficulty of revocation to a large extent (no point revoking a cert that will expire in 24 hours, at least in most applications). However, issuing short-lived certs so that they reside in all pertinent users' browsers still is a management cost.

These management costs can be alleviated with use of they system described herein as follows. Assuming that one-day time accuracy is enough, the State Department issues to a user U a certificate containing 10 validity fields and 1 revocation field: e.g., $$C=SIG_{SD}(SN,PK,U,D_1,D_2,A_{365},B_{365},C_{365},D_{365},E_{365},\\F_{365},G_{365},H_{365},I_{365},J_{365},Y_1,)$$

where the first validity field, $A_{365}$, corresponds to security-clearance level 1 . . . and the 10th validity field, $J_{365}$, corresponds to security-clearance level 10, while, as usual, $Y_1$, is C's revocation field. Cert C is used as follows. If, on day n, U is in good standing (i.e., cert C is still valid), and U's security-clearance level is 5, then the State Department publicizes (e.g., sends to all its responders in a distributed implementation) the 20-byte validity proof $E_{365-n}$. If, on day m, U's security-clearance level becomes 2, then the State Department publicizes $B_{365-m}$. And so on. As soon as C becomes invalid (e.g., because U is terminated as an employee or because U's secret key is compromised), then the State Department publicizes $Y_0$ (and erases "future" A, B, C, D, E, F, G, H, I, and J values from its storage).

This way, cert C, though internally specifying its own privileges, needs not be revoked when these privileges change in a normal way, and users need not load new certs in their browsers. In essence, the system described herein has such minimal footprint, that a CA (rather than issuing, revoking, and re-issuing many related certs) can issue with great simplicity a single cert, having a much higher probability of not being revoked (because changes of security-clearance level do not translate into revocation). As a result, fewer certs will end up been issued or revoked in this application, resulting in simpler PKI management.

In sum,
the system described herein replaces the complex certificate management relative to a set of dynamically changing properties or attributes by a single certificate (with minimum extra length) and a single 20-byte value for attribute.

Telecom companies may use a method similar to that of Example 2 to switch a given wireless device from one rate plan to another, or for roaming purposes.

Landlord CAs and Tenant CAs

A main PKI cost is associated to the RA function. Indeed, identifying a user U may require an expensive personal interview and verifying that indeed U knows the right secret key (corresponding to the to-be-certified public key PK). It would be nice if this RA function could be shared across many CAs, while enabling them to retain total independent control over their own certs.

Example 3

Organization Certificates

The Government and big organizations consist of both parallel and hierarchical sub-organizations: departments, business units, etc. An employee may be affiliated with two or more sub-organizations. For instance, in the U.S. Government, he may work for NIST and the Department of Commerce. Issuing a digital certificate for each such affiliation results in a high total number of certificates and a complex PKI management: every time an employee drops/adds one of his/her affiliations, it is best to revoke the corresponding cert/issue a new one. Ideally, two opposites should be reconciled: (1) The Organization issues only one cert per employee, and (2) Each Sub-Organization issues and controls a separate cert for each of its affiliates.

These two opposites can be reconciled by the system described herein as follows. To begin with, notice that the system described herein is compatible with de-coupling the process of certification from that of validation, the first process being controlled by a CA and the second by a validation authority (VA). For instance, assuming a one-day time accuracy, once a CA is ready to issue a certificate C with serial number SN, it sends SN to a VA, who selects $Y_0$ and $X_0$, secretly stores the triplet (SN, Y0, X0), computes as usual $Y_1$ and $X_{365}$, and then returns $Y_1$ and $X_{365}$ to the CA, who includes them within C. This way, the CA need not bother validating C: the CA is solely responsible for identifying the user and properly issuing C, while the VA is the only one who can prove C valid or revoked. This de-coupling may be exploited in a variety of ways in order to have organization certificates that flexibly reflect internal sub-organization dynamics. The following is just one of these ways, and uses Government and Departments as running examples. The Government as a whole will have its own CA, and so will each Department.

Envisaging k different Departments with corresponding CAs, $CA^1 \ldots CA^k$, and one-day time accuracy, a Government certificate C has the following form:

$$C = SIG_{GOV}(SN, PK, U, D_1, D_2, X_{365}, Y_1, [X_{365}^1, Z_{365}^1], \ldots, [X_{365}^k, Z_{365}^k])$$

where, as usual, SN is the cert's serial number, PK the public key of the user, U the user's identity, $D_1$ the issue date, $D_2$ the expiration date, $X_{365}$ the validity field, $Y_1$ the revocation field, and where $X_{365}^j$ is the validation field of $CA^i$; and
$Z_{365}^j$ is the suspension field of $CA^j$.

Such a certificate is generated by the Government CA with input from the Department CAs. After identifying the user U and choosing a unique serial number SN, the issue date $D_1$, and the expiration date $D_2$, the Government CA sends SN, PK, U, $D_1$, $D_2$ (preferably in authenticated form) to each of the Department CAs. The jth such CA then chooses two secret 20-byte values $X_0^j$ and $Z_0^j$,
locally stores (SN, PK, U, $D_1$, $D_2$, $X_0^j$, $Z_0^j$) or, more simply, (SN, $X_0^j$, $Z_0^j$); and
returns $[X_{365}^j, Z_{365}^j]$ for incorporation in the Government certificate in position j (or with "label" j).

This certificate C is managed with a distributed version of the system described herein as follows, so as to work as a 1-cert, a 2-cert, ..., a k-cert; that is, as k independent certs, one per Department. On day n, envisaging 100 responders, the Government CA sends all 100 responders the 20-byte value $X_{365-n}$ if C is still valid, and $Y_0$ otherwise.
the jth Department CA sends all 100 responders the 20-byte value $X_{365-n}^j$ to signify that C can be relied upon as a j-cert and $Z_{365-n}^j$ otherwise.

Therefore, the Government CA is solely responsible for identifying the user and issuing the certificate, but each of the Department CAs can independently manage what de facto is its own certificate. (This is absolutely crucial. If $CA^1$ were the Justice Department and $CA^2$ the DOD, then, despite some overlapping interests, it is best that each acts independently of the other.) The resulting certificate system is very economical to run. First, the number of certs is greatly reduced (in principle, there may be just one cert for employee). Second, a given employee can leave and join different Departments without the need of revoking old certs or issuing new ones. Third, different Department CAs may share the same responders. (In fact, whenever the mere fact that a given user is affiliated with a given Department is not a secret—something that will be true for most departments—the servers essentially contain only "publishable information".) Thus a query about the status of C as a j-certificate is answered with two 20-byte values: one as a Government cert and one as a j-cert. This enables one to more nimbly revoke C at a "central level" (e.g., should U lose the secret key corresponding to PK).

Possible Alternatives

In the above example, certificate C was only revocable in a central way, but it could easily be arranged that the responsibility of revocation is push down to individual Departments. For instance, to enable the jth Department CA, in full autonomy, to revoke as well as suspend C as a j-certificate, C may take the following form:

$$C = SIG_{GOV}(SN, PK, U, D_1, D_2, [X_{N1}^1, Y_1^1, Z_{N1}^1], \ldots, [X_{Nk}^k, Y_1^1, Z_{Nk}^k])$$

Also, different departments may have different time accuracies for their own certs. This too can be easily accomplished by having C of the following format, $$C = SIG_{GOV}(SN, PK, U, D_1, D_2, [TA^1, X_{N1}^1, Y_1^1, Z_{N1}^1], \ldots, [TA^k, X_{Nk}^k, Y_1^1, Z_{Nk}^k])$$

where
$TA^j$ is the time accuracy of the jth CA; and
Nj is the number of time units between $D_1$ and $D_2$. (E.g., if $TA^j$ is one day and $D_1 - D_2 = 1$ year, then $X_{Nj}^j = X_{365}^j$.)

Landlord CAs, Tenant CAs, and Leased Certs

Within a single organization, one major advantage of issuing certs structured and managed as above consists in enabling the cert to stay alive though the user moves from one sub-organization to another. It should be realized, however, that the above techniques are also applicable outside a single-organization domain. Indeed, the Government CA can be viewed as a landlord CA, the k Department CAs as tenant CAs servicing unrelated organizations (rather than sub-organizations), and the certificate can be viewed as a leased cert. This terminology is borrowed from a more familiar example where the advantages of "joint construction and independent control" apply. Leased certs are in fact analogous to spec buildings having the identical floor footprints. Rather than building just his own apartment, a builder is better off constructing a 20-floor building, setting himself up in the penthouse apartment and renting or selling out right the other floors. Each of the 20 tenants then acts as a single owner. He decides in full autonomy and with no liability to the builder whom to let into his flat, and whom to give the keys. A 20-story building is of course less expensive than 20 times a single-story one: it may very well cost 10 times that. This economy of scale is even more pronounced in a leased cert. Indeed, the cost of issuing a regular cert and that of issuing a leased one is pretty much the same. Thus issuing leased certs could be very profitable to a landlord CA, or at least repay it completely of the costs incurred for its own certs. On the other hand, tenant CAs have their advantage too, in fact 1. they save on issuance costs: they share the cost of issuing a cert k ways; and
2. they save on infrastructure costs: they share the same responders (since they contain only public data).

Natural candidates to act as landlord CAs for external tenant CAs are:

credit card companies;
large financial institutions, and again
the Government (e.g., via the USPS or the IRS).

In many cases, in fact, they have long and close relationships with millions of "users" and may more easily issue them a digital cert without investing too many resources for user identification (e.g., a credit card company has been sending bills for years to its customers, and can leverage this knowledge). A credit card company may like the idea of issuing certificates as a landlord CA in order to run more effectively its own affinity program (having hotel chains, airlines etc. as their tenants). The IRS may have already decided to use digital certificates, and leased certs may later on provide them with a revenue stream that will repay of the costs incurred for setting up a faster and better service.

Future Tenant CAs

So far, the way we have described landlord and tenant CAs requires that the landlord CA cooperates with its own tenant CAs during the issuance process, and thus that it has already identified its tenant CAs beforehand. It is actually possible, however, for a landlord CA to issue rental certs, envisioning—say—100 tenant CAs, without having identified all or any of these tenants. Rather, future tenant CAs will be able to rent space in already issued certs. This capability is ideal for new cert-enabled applications. Rather than undergoing the expenses necessary to issue certs to millions of customers, a company offering a new certificate-enabled product may approach a landlord CA having issued millions of certs, rent space in them after the facts, and then sign on as customers a large portion of the landlord-CA users by turning ON all their corresponding certs overnight (without any customer identification and other issuing costs) and then starting managing them according to its own criteria. We shall describe various techniques for enabling this functionality below. For simplicity of exposition, we shall call L the landlord CA and envision that a tenant CA, T, just gains control in the future of a validity field (e.g., the $51^{st}$ validity field) in all already issued k-certs, enabling T to prove the validity of "his own cert." However, as we have seen above, T may also have additional fields of his own: e.g., his own revocation field and/or his own suspension field. These fields are however handled in a way similar to that of the validity field and are thus not directly discussed.

An important property that we wish to capture is that the landlord CA does not incur liabilities for the management of T's certs. The key to ensure this property is that only T knows the H-inverses of his own validity fields and thus only T can prove valid his own certs, and cannot accuse L of divulging crucial information that causes a mismanagement of T's (rented) certs.

Assume, without loss of generality, that L wishes to have 100 tenant CAs, and that 50 of them, T1, . . . , T50, have already "signed up" as tenant CAs and additional 50 tenant CAs may sign up in the future. The first 50 CAs may have already provided L with their own validity fields so far (and they as well provide L with all their validity fields in certificates to be issued by L in the future). Then, L will compute the validity fields to be assigned to future tenant CAs in a way that guarantees that L does not know, except for the validity field themselves of course, the corresponding H-chains leading to the validity fields (by an H-chain we mean the sequence of values starting with an X0 and ending with a validity field).

For instance, a secure-hardware device D may be used to generate each H-chain, output the validity field, and keep secret inside the initial value $X_0$ (or the entire H-chain, or part of it). The output validity field is then inserted in a certificate C that L issues as one of the last 50 validity fields of C. Preferably, a separate device D51 will be used to generate all $51^{st}$ validity fields in L's certs, a separate device D52 for generating all $52^{nd}$ validity fields in L's certs, and so on.

Alternatively, L may have a third party B generate the H-chains, provide L with their corresponding validity fields and keep the rest of the H-chain secret, or keep the corresponding $X_0$ secret and erase the rest of the H-chain. Preferably, there will be different third parties: for instance, B51 will be in charge of generating the $51^{st}$ validity fields, B52 will generate the $52^{nd}$ validity fields, etc. Such parties Bi, may themselves use secure-hardware to generate the ith H-chains, to ensure that they are not going to leak future proof of validity of the "ith Certs" (i.e., the certs whose validity is proved with the ith validity field) deliberately, inadvertently, or because subject to a malicious attack.

Alternatively yet, each H-chain may be generated by a multiplicity of third parties (e.g., A1, A2, A3, A4 and A5), so that the corresponding validity field is easily computed and output, while its H-chain is not known to or easily computable by any individual third party (e.g. each Aj individually), but is computable easily by all third parties together (based on secret information they possess).

In the simplest embodiment, a validity field X could be so computed by two parties A1 and A2: A1 computes his own H-chain having $X^1$ as the last value; A2 computes his own (ideally equally long) H-chain having $X^2$ as the last value, and X is then set to be a combination of $X^1$ and $X^2$. (For instance X is chosen as the concatenation of $X^1$ and $X^2$: $X=X^1, X^2$; or $X=H(X^1, X^2)$; or $X=X^1+X^2 \mod 2^{160}$, or each bit of X is the sum mod 2 of the corresponding bit of $X^1$ and $X^2$. In the first case, the jth inverse of X in the "resulting chain" is defined to be the concatenation of the jth inverse of $X^1$ with the jth inverse of $X^2$. In the second case, the jth inverse of X is defined to be the concatenation of two values such that hashing the first j times and hashing the second j times and hashing together their results yields X. In the third case, the inverse of X is defined to be the concatenation of two values such that hashing the first j times and hashing the second j times and adding together their results mod $2^{160}$ yields X. In the fourth case, the jth inverse of X is defined to be the concatenation of two values such that hashing the first j times and hashing the second j times and taking the sum mod 2 of each of their resulting bits yields the corresponding bit of X.)

Preferably, such a (resulting) H-chain should not be known or easily computable by not just to a single third party, but even to/by special subgroups of third parties (e.g., any group of 3 third parties should not be able to compute a chain in any reasonable amount of time, even if its members collaborate in any fashion and share all the information in their possession). This ensures that even if more than one third party is malicious, then each H-chain (except for the validity field of course) remains secret. Preferably too, such a H-chain should be easily computable not just by all third parties, but by some other special subgroups of the third parties (e.g., any subgroup of 4 or more third parties). This ensures that even if some third party becomes malicious or unavailable, the H-chain could still be computed. Several such methods are known in the cryptographic literature. As further protection, secure-hardware may be used by the third parties or groups of third parties so as to ensure that H-chains corresponding to validity fields inserted in L's certs (in positions 51 through 100) are not leaked deliberately, inadvertently, or as a result of a malicious attack.

Assume now that a tenant CA, e.g., without limitation intended T51, contacts L to gain control of the $51^{st}$ validity field in each cert C of L, so as to be able to manage the corresponding cert "C51" on his won. This is accomplished by providing T51 with all $51^{st}$ H-chains, or with their initial $X_0$ values. This is doable because all such chains/initial values are in secret storage and could be delivered to T51, preferably in a way that makes the relevant H-chains known only to T51. For instance, if the H-chains are stored in a special secure-hardware device D, then, under tight control, D may deliver the H-chains to T51. For instance, D may be delivered to T51, and then a special signal (e.g. a special password, a digital signature, a digital signature relative to a public key securely embedded into D) can be input to D (e.g., by L) so that D would output the desired secrets. Better yet, D should be manufactured so that more than one special signal would be needed.

If the same secure device D securely stores secrets relative to other validity fields (e.g., the $52^{nd}$ validity fields), then D may, under tight control and special signals deliver only the $51^{st}$ secrets to T51, or it may deliver the $51^{st}$ secrets to a second secure device D' (e.g., a secure smart card) which will then be delivered to T51, and then other special signals may induce D' to output or make available its available secrets into T51's environment. Better yet, D may, under tight control and special signals deliver different pieces of information to different secure devices (e.g., two secure devices D' and D''), and then these secured devices can be brought (preferably by independent routes, to T51, where they would under tight control and special signals release in T51's environment their pieces of information so that the proper secrets would be easily reconstructed from them.

Alternatively, D may under tight control and special signals deliver the proper secrets to T51 encrypted in a key known to T51. (For instance, T51 may generate a special public-secret key encryption pair, the public key may be input to D—e.g., digitally signed, say, by L—and then, possibly after additional special signals, D may output the proper $51^{st}$ secrets encrypted with T51's special public encryption key. T51, and only T51, will then easily decrypt and obtain the $51^{st}$ secrets.)

If a third party has generated the hash chains, then, after due control and authorization, the third party may take appropriate steps (e.g., steps discussed above) so as to privately deliver the $51^{st}$ secrets to T51.

If a group of third parties collectively know the $51^{st}$ H-chains, then sufficiently parties in the group may individually and securely deliver to T51 the information in their possession so that T51 may privately enter in possession of such H-chains or of information that enables him quickly to recompute such H-chains.

A secure device here should be construed to include a secure facility in which all relevant computations take place.

An Embodiment

This procedure can be greatly simplified by having a future tenant CA enter in possession not of all chains or their initial values, but of just one value (or a few values) from which he can reconstruct all chains. One way to accomplish this economy is the following. L has a secret seed S51, from which it computes all the $51^{st}$ H-chains. Whenever L wishes to embed the $51^{st}$ validity field in a cert C, L may use S51 and information associated to C so as to generate an initial value X0 that is essentially unique to C. For instance, L could generate C's initial value for the $51^{st}$ H-chain, $X_0$, on inputs S51 and C's serial number SN: without limitation intended, L could simply choose X0=H($S^{51}$, SN). Then only this seed $S^{51}$ needs to be delivered to T51 in the future: from it T51 can then generate the H-chain of each of "his cert." For instance, to generated the value Xj of the cert with serial number SN, T51 simply computes X0=H($S^{51}$, SN) which is just one hash, and then computes Xj by just j additional hashings.

This method can be advantageously combined with any of the methods described above. For instance, a secure device D may just safe keep only $S^{51}$, compute from it all desired H-chains and validity fields, and then release $S^{51}$ in T51's hands when the right time comes. In particular, two third parties A1 and A2 may generate their own "half" of all $51^{st}$ H-chains: A1 using a seed S1$^{51}$ and A2 using a seed S2$^{51}$. In particular, A1 can generate the initial value of the $51^{st}$ chain of a certificate C with serial number SN by computing H(S1$^{51}$, SN), and A2 by computing H(S1$^{51}$, SN). Each of them then returns his own half of the final validity field to L, L then combines them to produce C's $51^{st}$ validity field (e.g., by a single hash or a single modular addition as indicated above). When the future tenant CA appears, then A1 will be responsible to convey S1$^{51}$ to T51 and A2 to convey S2$^{52}$ to T51.

Activation of Tenant Certificates

The fact that a lease certificate may in one stroke generate millions of tenant certificates may not mean that all of them are "active." Indeed, if to enjoy the benefits of a tenant certificate a user U needs to pay certain dues to the tenant CA T, then U's consent would be needed. (T might initially waive or significantly reduce the dues of its tenant certs, but eventually has to decide which users should have them "long term.") Having U contact—e.g., in person or in writing—T may not be convenient at all, and having U just generically indicate his consent may generate false representations and lots of confusion. It is here that the original cert issued by landlord L may play a very beneficial role. Namely, if T inherits (in its standard tenant cert) the same public key PKU certified within L's original cert C as U's public key, then T may use PKU (and thus C) to establish U's consent. For instance, U may contact T for "turning on" his own tenant cert and his consent can be established by having T challenge U with a random string R, and have U respond by returning R's digital signature relative to PKU. (If PKU is the public key of an encryption scheme, then E may challenge U with the encryption—with key PKU—of a random string R, and see whether the challenge in responded with the string R in the clear or encrypted in a key known to T.) Because C can be verified by T (with L's public key) and because T trusts that L properly identified U prior to issuing C, the proper response about R proves to T that he is dealing with someone knowing the secret key corresponding to the public key PKU, and thus with U. Therefore, E may activate its own tenant certificate for U. One way to implement such activation is having T offer to its tenant users a deadline to properly request activation of their T-tenant certificates. Up to the deadline, T, managing its own validation/revocation process, will ensure that all inquiries about its own tenant certs will receive a validity answer. At or after the deadline, all those users who do not properly request activation will have their certificates revoked, while the others' tenant certificates will continue to be valid. Another way to activate the tenant certificates of requesting users may be accomplished by having T put all its new tenant certs on "suspension", and then make valid those certs whose users are willing to pay for/properly request activation.

Two-Party Validation

There is another use of the system described herein that provides an additional advantage: namely, two-party validation. In the OCSP, once a user presents his certificate to a relying party, he intends to conduct a two-party transaction. But the OCSP transforms this transaction in a 3-party one, by querying a third party about the user's certificate. This makes each transaction more complex and more expensive. The system described herein instead enables transactions to remain essentially two-party. Namely, a user may—e.g., at midnight—receive a 20-byte proof of the validity of his certificate for the remainder of the day. (This 20-byte value can be obtained upon request of the user, or pushed to the user's cellular device automatically—e.g., by means of a SMS message or other control message.) Due to its trivial length, this proof can be easily stored in most cellular telephones and PDAs. Then, whenever the user wants to transact on that day, the user simply sends its own certificate together with the cert's 20-byte proof of validity for that day. Because the proof of validity is universally verifiable, the verifier of the cert and proof need not call any CA, any responder, or any third party. (From such a call it may only receive the same proof of validity that he now receiving from the user directly.) The verifier can work totally off-line. In the cellular environment, in which any call translates into money and time costs, this off-line capability is of great value. Such two-party validation could also be implemented when the user's cert resides in other platforms, such a PC or a lap-top (where the user can receive his proof of current validity through the Web or the Internet), or a smart card, where the daily proof of validity can be delivered via a card reader (e.g., from the Internet or a private database). In particular the user's current proof of validity can be delivered to the user (or user's device) by the relying party. That is, a user may contact a relying party for a transaction requiring his certificate. For instance the user may present his certificate to the relying party, or the relying party may have in storage a copy (e.g., from a prior transaction). The user does not, however, present his proof of current validity (e.g., because he does not have it yet). The relying party requests and receives the current proof of validity for the user cert (e.g., from a responder), verifies it, and, as a favor, also sends the user his current proof of validity. The user then caches this proof and then forwards it to any relying party he transacts with in the remainder of the day, thereby making all those other transactions two-party.

Another setting where this capability is of great value is that of physical security. For instance, in this application the relying party to which the user presents his cert could be the control mechanism of a door to which the user presents his certificate together with his current proof of validity. This presentation can be done in a variety of ways. For instance, the user's cert and validity proof for the day may reside in a smart card of the user, that he may swipe through a card reader (if it is not a contact-less one). The cert in the card testifies that the user has the right to go through that door, and the current proof of validity that he has that right that day. The door can, therefore, realize that the user is fully authorized to enter through that door at that time by just performing a local verification (e.g., verifying the cert and the proof of validity that day), without any call to any third party. This is a much more attractive solution to having the door connected via a secure network to a secure database where the knowledge of who is currently authorized resides. Indeed, should the door be in a public and large area such an airport or a large office building, it would not be quite clear what a secure network may mean in such a setting, and in any case it would be very expensive to provide such a secure-network connection.

Transferring the daily proof of validity onto the user's card may be easily accomplished by having the user swipe his card at a "wired" card reader at the airport/building main entrance. Providing a secure network connection to just one or a few such readers may be affordable. But after the user checks in any of such few special location his card will load the validity proof for the remainder of the day, which he then will use in a two-party mode as explained above at any other secure (but without secure-network connection) door in the airport/building. This will dramatically lower the expenses of installing and maintaining secure-network access.

Referring to the sole FIGURE, a diagram 10 illustrates a card holder, a door, a card, a proof, and an authority according to the system described herein. The card may store a proof provided by an authority. The proof may be as described elsewhere herein (e.g. may be a one-way hash) and may or may not be digitally signed (using, for example, the authority's private key). The proof may include time interval information indicating times when the proof is valid and may include access rights indicating the particular access allowed the card holder. As described elsewhere herein, when the time interval indicates that the card (proof) has expired, the card holder may obtain an update (new proof) from an authority.

Once an up-to-date proof has been provided to the card, the card holder may then present the card to the door (door mechanism) which examines the proof and, if the proof is valid and not expired, the card holder is allowed egress through the door. As described elsewhere herein, the door does not require any prior knowledge of the proof or any separate validation or verification of the proof. The proof is self-contained and does not require any independent validation or verification by any other entity. Thus, the transaction between the door and the card holder is essentially a two party transaction.

The granularity and security of the system is in sharp contrast to quite recent practices at airports, where all access badges were revoked and reissued only when a third of the total badges were lost or invalidated. So much in fact was the cost of managing such access.

These two-party applications may work very well with the system described herein, but may be enjoyed by any other system in which a cert has a universally verifiable and cacheable proof of validity that lasts for a specified amount of time.

Of course, a user's cert needs not be devoted to open just a given door or to grant wide airport/building access. The user cert may have different validity fields (each possibly coupled with its revocation and suspension fields). One of these fields may be devoted to access a given door or doors, another to access different door(s), another to generally access certain areas of the airport/building/complex etc.

While the invention has been disclosed in connection with various embodiments, modifications thereon will be readily apparent to those skilled in the art. Accordingly, the spirit and scope of the invention is set forth in the following claims.

REFERENCES

[1] *Efficient Certificate Revocation*; by Silvio Micali; Proceedings 1997 RSA Data Security Conference.
[2] *Online Certificate Status Protocol*, version 2. Working document of the Internet Engineering Task Force (IETF) RFC 2560.
[3] Public Key Infrastructure, Final Report; MITRE Corporation; National Institute of Standard and Technology, 1994.
[4] *Secure Hash Standard*; FIPS PUB 180, Revised July 11, 94 (Federal Register, Vol. 59, No. 131, pp. 35211-34460); revised Aug. 5, 1994 (Federal Register Vol. 59, No. 150, pp. 39937-40204).
[5] *Low-Cost Hash Sequence Traversal*; by Markus Jakobsson; Financial Cryptography 2002.
[7] *Internet Public Key Infrastructure, Part III: Certificate Management Protocols;* by S. Farrell, A. Adams, and W. Ford; Internet Draft, 1996
[8] *Privacy Enhancement for Internet Electronic Mail—Part II: Certificate-Based Key Management*; by S. Kent and J. Linn; 199.

The invention claimed is:

1. A method of accessing a door, comprising:
providing a card with previously-verified data that includes a digital signature;
causing the card to receive a proof of access rights to the door for a specified time interval, wherein the specified time interval includes at least some time after a time that the previously-verified data was verified, and wherein the proof is unverified and separate from the previously-verified data, wherein the unverified proof does not include an associated digital signature;
causing the card to be presented to a mechanism of the door at a current time, the mechanism being local to the door;
causing the mechanism to locally verify the proof without verification of the proof from any other party; and
causing the door to open if the proof is verified and the current time is within the specified time interval.

2. A method according to claim 1, wherein the card receives the proof from a wired card device.

3. A method according to claim 1, wherein the card is contactless.

4. A method according to claim 1, wherein the card is at least one of: a cellular phone and a PDA.

5. A method according to claim 1, wherein the card receives the proof via the Internet.

6. A method according to claim 1, wherein the card receives the proof wirelessly.

7. A method according to claim 1, wherein the card receives the proof from a relying party during a prior interaction.

8. A method according to claim 7, wherein the relying party queried for and received the proof from a responder.

9. A method according to claim 1, wherein the previously-verified data includes a digital certificate.

10. A method according to claim 9, wherein the digital signature is relative to a public key certified within the digital certificate contained in the card.

11. A method according to claim 10, wherein the card presents to the mechanism of the door both the proof and the certificate.

12. A method according to claim 10, wherein a public key certified within the certificate is obtained by iterating a one-way hash function.

13. A method according to claim 10, wherein the access rights are selected from the group consisting of: granted, suspended, re-granted, re-suspended or revoked keeping the same certificate.

14. A method according to claim 13, wherein the proof is one of a plurality of proofs relative to a plurality of access rights.

15. A method according to claim 1, wherein the specified time interval is one day.

16. A method according to claim 1, wherein the access rights are selected from the group consisting of: granted, suspended, re-granted, re-suspended or revoked.

17. A method according to claim 16, wherein the proof is one of a plurality of proofs relative to a plurality of access rights.

18. A method according to claim 17, wherein a single authority manages the plurality of access rights.

19. A method according to claim 17, wherein the plurality of access rights are independently managed by a plurality of authorities.

20. A method according to claim 1, wherein the proof is one of a plurality of proofs relative to a plurality of access rights.

21. A method according to claim 1, wherein locally verifying the proof includes performing a one-way function on the proof to yield result data within the mechanism that locally verifies the proof.

22. A method of issuing a card to a user for accessing a door, comprising:
verifying that the user is entitled to access rights to the door;
providing the card with previously-verified data that includes a digital signature; and
if the user is entitled to access rights to the door, causing the card to receive a proof of access rights to the door for a specified time interval, wherein the proof is unverified and separate from the previously-verified data, wherein the unverified proof does not include an associated digital signature, wherein the specified time interval includes at least some time after a time that the previously-verified data was verified, and wherein, in response to the card being presented to a mechanism of the door at a current time, the mechanism being local to the door, and without verification of the proof from any other party, the mechanism locally verifies the proof and causes the door to open if the proof is verified and the current time is within the specified time interval.

23. A method according to claim 22, wherein the card receives the proof from a wired card device.

24. A method according to claim 22, wherein the card is contactless.

25. A method according to claim 22, wherein the card is at least one of: a cellular phone and a PDA.

26. A method according to claim 22, wherein the card receives the proof via the Internet.

27. A method according to claim 22, wherein the card receives the proof wirelessly.

28. A method according to claim 22, wherein the card receives the proof from a relying party during a prior interaction.

29. A method according to claim 22, wherein locally verifying the proof includes performing a one-way function on the proof to yield result data within the mechanism that locally verifies the proof.

30. A method of granting access to a door, comprising:
providing previously-verified data that includes a digital signature;
locally verifying a proof provided to a mechanism of the door at a current time, the mechanism being local to the door, and without verification of the proof from any other party, wherein the proof is unverified and separate from the previously-verified data, wherein the unverified proof does not include an associated digital signature, wherein the proof indicates access rights to the door for a specified time interval, and wherein the specified time interval includes at least some time after a time that the previously-verified data was verified; and
causing the door to open if the proof is verified and the current time is within the specified time interval.

31. A method according to claim 30, wherein the digital signature is relative to a public key certified within a digital certificate.

32. A method according to claim 31, wherein the mechanism of the door is presented with both the proof and the certificate.

33. A method according to claim 31, wherein a public key certified within the certificate is obtained by iterating a one-way hash function.

34. A method according to claim 30, wherein the specified time interval is one day.

35. A method according to claim 30, wherein the access rights are selected from the group consisting of: granted, suspended, re-granted, re-suspended or revoked.

36. A method according to claim 35, wherein the proof is one of a plurality of proofs relative to a plurality of access rights.

37. A method according to claim 36, wherein a single authority manages the plurality of access rights.

38. A method according to claim 36, wherein the plurality of access rights are independently managed by a plurality of authorities.

39. A method according to claim 30, wherein the access rights are selected from the group consisting of: granted, suspended, re-granted, re-suspended or revoked keeping the same certificate.

40. A method according to claim 39, wherein the proof is one of a plurality of proofs relative to a plurality of access rights.

41. A method according to claim 30, wherein the proof is one of a plurality of proofs relative to a plurality of access rights.

42. A method according to claim 30, wherein locally verifying the proof includes performing a one-way function on the proof to yield result data within the mechanism that locally verifies the proof.

* * * * *